(12) United States Patent (10) Patent No.: US 8,032,414 B2
Payne et al. (45) Date of Patent: Oct. 4, 2011

(54) SYSTEM AND METHOD FOR PROVIDING RECEIPTS, ADVERTISING, PROMOTION, LOYALTY PROGRAMS, AND CONTESTS TO A CONSUMER VIA AN APPLICATION-SPECIFIC USER INTERFACE ON A PERSONAL COMMUNICATION DEVICE

(75) Inventors: Edward A. Payne, Greensboro, NC (US); Rodger Williams, Siler City, NC (US)

(73) Assignee: Gilbarco Inc., Greensboro, NC (US)

( * ) Notice: Subject to any disclaimer, the term of this patent is extended or adjusted under 35 U.S.C. 154(b) by 551 days.

(21) Appl. No.: 11/761,695

(22) Filed: Jun. 12, 2007

(65) Prior Publication Data

US 2008/0308628 A1 Dec. 18, 2008

(51) Int. Cl.
*G06Q 30/00* (2006.01)
*G06F 7/08* (2006.01)

(52) U.S. Cl. ............... 705/14.53; 705/14.38; 705/14.65; 235/381

(58) Field of Classification Search .................... 705/14, 705/14.3, 14.37, 14.38, 14.49, 14.64, 14.65; 235/381
See application file for complete search history.

(56) References Cited

U.S. PATENT DOCUMENTS

| | | | |
|---|---|---|---|
| 5,327,066 A | | 7/1994 | Smith |
| 5,390,125 A * | | 2/1995 | Sennott et al. ............... 701/214 |
| 5,717,374 A | | 2/1998 | Smith |
| 5,884,289 A | | 3/1999 | Anderson et al. |
| 5,969,324 A * | | 10/1999 | Reber et al. ............... 235/462.13 |
| 6,052,629 A * | | 4/2000 | Leatherman et al. ......... 700/241 |
| 6,073,840 A | | 6/2000 | Marion |
| 6,533,168 B1 * | | 3/2003 | Ching ............................ 235/375 |
| 6,574,603 B1 | | 6/2003 | Dickson et al. |
| 6,678,666 B1 | | 1/2004 | Boulware |
| 6,705,520 B1 * | | 3/2004 | Pitroda et al. ............... 235/382.5 |
| 6,764,003 B1 | | 7/2004 | Martschitsche et al. |
| 6,764,013 B2 * | | 7/2004 | Ben-Aissa ............... 235/472.01 |
| 6,829,596 B1 * | | 12/2004 | Frazee ............................ 705/66 |
| 7,031,945 B1 * | | 4/2006 | Donner ............................ 705/64 |
| 7,039,389 B2 * | | 5/2006 | Johnson, Jr. ................... 455/406 |
| 7,146,325 B2 * | | 12/2006 | Yamakawa et al. ........... 705/344 |
| 7,275,041 B1 | | 9/2007 | Cue et al. |
| 7,403,913 B2 * | | 7/2008 | Wood ............................. 705/26 |
| 7,574,377 B2 | | 8/2009 | Carapelli |
| 7,577,586 B2 * | | 8/2009 | Frentzel-Beyme et al. ..... 705/26 |

(Continued)

OTHER PUBLICATIONS

"Top up your Parking Meter with a Cell Call—New service allows drivers to call a city phone number to pay meter charges" Bill Boei; Vancouver Sun; Jun. 27, 2006 (2 pages).

(Continued)

*Primary Examiner* — John Weiss
*Assistant Examiner* — Adam Chornesky
(74) *Attorney, Agent, or Firm* — Nelson Mullins Riley & Scarborough, LLP

(57) ABSTRACT

Systems and methods for performing a consumer advertising transaction at a retail device are disclosed. According to one system and method, an identifier associated with the retail device is provided to a personal communication device. An application-specific user interface specific to the retail device is associated based on the identifier. A selection is received for the consumer advertising transaction made by a consumer interacting with the application-specific user interface executing on the personal communication device. The consumer advertising transaction is performed based on the received selection for the consumer advertising transaction made by the consumer interacting with the application-specific user interface.

73 Claims, 18 Drawing Sheets

U.S. PATENT DOCUMENTS

| | | | |
|---|---|---|---|
| 7,587,358 B2* | 9/2009 | Hambrecht et al. | 705/37 |
| 7,658,323 B2* | 2/2010 | Kleinman et al. | 235/380 |
| 7,664,885 B2 | 2/2010 | Carapelli | |
| 2001/0018664 A1 | 8/2001 | Jacoves et al. | |
| 2002/0062251 A1 | 5/2002 | Anandan et al. | |
| 2002/0072379 A1 | 6/2002 | Chen et al. | |
| 2002/0085515 A1* | 7/2002 | Jaynes et al. | 370/329 |
| 2002/0128908 A1* | 9/2002 | Levin et al. | 705/14 |
| 2002/0143655 A1 | 10/2002 | Elston et al. | |
| 2002/0152123 A1* | 10/2002 | Giordano et al. | 705/14 |
| 2003/0075600 A1* | 4/2003 | Struthers et al. | 235/381 |
| 2003/0083936 A1 | 5/2003 | Mueller et al. | |
| 2003/0182197 A1 | 9/2003 | Beckman | |
| 2004/0030601 A1 | 2/2004 | Pond et al. | |
| 2004/0035644 A1 | 2/2004 | Ford et al. | |
| 2004/0050648 A1 | 3/2004 | Carapelli | |
| 2004/0083170 A1* | 4/2004 | Bam et al. | 705/40 |
| 2004/0254861 A1* | 12/2004 | Pentel | 705/27 |
| 2005/0165658 A1 | 7/2005 | Hayes et al. | |
| 2005/0171905 A1 | 8/2005 | Wankmueller et al. | |
| 2005/0187882 A1 | 8/2005 | Sovio et al. | |
| 2005/0228720 A1 | 10/2005 | Pavlic et al. | |
| 2005/0284928 A1 | 12/2005 | Harrell | |
| 2006/0059037 A1* | 3/2006 | Ivey et al. | 705/13 |
| 2006/0095328 A1 | 5/2006 | Ross et al. | |
| 2006/0178943 A1 | 8/2006 | Rollinson et al. | |
| 2006/0202024 A1 | 9/2006 | Phillips et al. | |
| 2006/0219780 A1* | 10/2006 | Swartz et al. | 235/383 |
| 2006/0232398 A1 | 10/2006 | Nedblake et al. | |
| 2007/0083381 A1 | 4/2007 | Farrell et al. | |
| 2007/0155307 A1 | 7/2007 | Ng et al. | |
| 2007/0156579 A1* | 7/2007 | Manesh | 705/39 |
| 2007/0161402 A1 | 7/2007 | Ng et al. | |
| 2007/0174082 A1 | 7/2007 | Singh | |
| 2007/0291710 A1 | 12/2007 | Fadell | |
| 2008/0040275 A1 | 2/2008 | Paulsen et al. | |
| 2008/0147546 A1 | 6/2008 | Weichselbaumer et al. | |
| 2008/0162346 A1 | 7/2008 | Aaron et al. | |
| 2008/0235105 A1* | 9/2008 | Payne et al. | 705/26 |
| 2008/0308628 A1* | 12/2008 | Payne et al. | 235/381 |
| 2008/0313028 A1* | 12/2008 | Williams et al. | 705/14 |
| 2008/0313062 A1* | 12/2008 | Williams et al. | 705/30 |
| 2008/0313078 A1* | 12/2008 | Payne et al. | 705/44 |
| 2009/0127328 A1* | 5/2009 | Aissa | 235/377 |

OTHER PUBLICATIONS

Portions of the file history for copending U.S. Appl. No. 11/761,700, entitled "System and Method for Consumer Notification that an Order is Ready for Pick Up via an Application-Specific User Interface on a Personal Communication Device" and filed on Jun. 12, 2007.

International Search Report and Written Opinion of International Searching Authority dated Sep. 23, 2008 for International Application No. PCT/US08/07367 filed on Jun. 12, 2008.

International Preliminary Report on Patentability issued by the International Bureau, dated Dec. 17, 2009 for International Application No. PCT/US08/07367 filed on Jun. 12, 2008.

International Preliminary Report on Patentability issued by the International Bureau, dated Dec. 17, 2009 for International Application No. PCT/US08/07197 filed on Jun. 9, 2008.

Portions of the file history for U.S. Appl. No. 11/761,688, filed Jun. 12, 2007.

Portions of the file history for U.S. Appl. No. 11/761,706, filed Jun. 12, 2007.

Portions of the file history for U.S. Appl. No. 11/761,710, filed Jun. 12, 2007.

International Search Report and Written Opinion, issued on Aug. 1, 2008, for International patent application PCT/US08/03571, filed on Mar. 18, 2008.

International Search Report and Written Opinion, issued on Sep. 9, 2008, for International patent application PCT/US08/07091, filed on Jun. 6, 2008.

International Search Report and Written Opinion, issued on Sep. 25, 2008, for International patent application PCT/US08/07362, filed on Jun. 12, 2008.

* cited by examiner

USER PREFERENCES

US 8,032,414 B2

SYSTEM AND METHOD FOR PROVIDING RECEIPTS, ADVERTISING, PROMOTION, LOYALTY PROGRAMS, AND CONTESTS TO A CONSUMER VIA AN APPLICATION-SPECIFIC USER INTERFACE ON A PERSONAL COMMUNICATION DEVICE

RELATED APPLICATIONS

The present application is related to commonly assigned U.S. patent applications Ser. No. 11/761,688, filed Jun. 12, 2007, entitled "SYSTEM AND METHOD FOR PROVIDING AN APPLICATION-SPECIFIC USER INTERFACE ON A PERSONAL COMMUNICATION DEVICE FOR CONDUCTING TRANSACTIONS WITH RETAIL DEVICES;" Ser. No. 11/761,700, filed Jun. 12, 2007, entitled "SYSTEM AND METHOD FOR CONSUMER NOTIFICATION THAT AN ORDER IS READY FOR PICK UP VIA AN APPLICATION-SPECIFIC USER INTERFACE ON A PERSONAL COMMUNICATION DEVICE;" Ser. No. 11/761,706, filed Jun. 12, 2007, entitled "SYSTEM AND METHOD FOR VERIFICATION OF SITE LOCATION USING AN APPLICATION-SPECIFIC USER INTERFACE ON A PERSONAL COMMUNICATION DEVICE;" and Ser. No. 11/761,710, filed Jun. 12, 2007, entitled "SYSTEM AND METHOD FOR MAPPING PAPER RECEIPTS TO ELECTRONIC RECEIPTS USING AN APPLICATION-SPECIFIC USER INTERFACE ON A PERSONAL COMMUNICATION DEVICE," which are hereby incorporated herein in their entirety.

FIELD OF THE INVENTION

The present invention relates to a system and method for providing an application specific user interface on a customer personal communication device for conducting transactions with retail fuel dispensers and/or other retail devices.

BACKGROUND OF THE INVENTION

Transaction processing within a retail fueling environment conventionally includes interaction between a customer and a fuel dispenser. The customer typically presses certain keys on a user interface provided on the fuel dispenser to provide input for a transaction. Output is provided to the customer by the user interface in response, typically via a visual display. The customer authorizes payment for the transaction by either communicating with an attendant situated at a point of sale (POS), or by swiping a credit card at the fuel dispenser, also referred to as "pay at the pump." The customer dispenses fuel and interacts with the user interface of the fuel dispenser to complete the transaction. The fuel dispenser user interface and control interface are resident on the fuel dispenser within these conventional systems. An example of such a fuel dispenser interface is the card reader in dispenser (CRIND®) equipped fuel dispenser manufactured by Gilbarco Inc., the assignee of the present application.

These conventional fuel dispenser interfaces provide a specifically designed user interface that varies according to the brand and their system designers. For example, a user interface provided on an ExxonMobil® branded fuel dispenser may be different from a Chevron® branded fuel dispenser. This user interface also often varies within different retail fueling environments based upon the fuel dispenser and other retail transaction devices (e.g., a car wash kiosk) installed. Further variations occur based on the selected programming options for the fuel dispensers.

For example, within certain retail fueling environments, the customer may automatically receive a receipt for the transaction without being prompted from the user interface. Within other retail fueling environments, the customer may be required to specifically respond to an inquiry provided by the user interface to receive a receipt for the transaction. Based upon the fuel dispenser programming, this receipt inquiry may be presented at the beginning of a transaction or at the end of the transaction. Furthermore, a customer's native language and the language provided by the user interface may not be the same. As such, the customer may not know when a response to an inquiry is required. In essence, the complexities of different user interfaces present varied transaction experiences for the customer among different retail fueling environments.

SUMMARY OF THE INVENTION

The present invention provides an application specific user interface on a customer personal communication device, such as a cell phone or personal digital assistant, for conducting transactions with fuel dispensers. The customer, by interacting with the application specific user interface on their personal communication device, as opposed to the built-in standard user interface on a fuel dispenser, provides input and receives output to conduct a transaction. In this manner, the customer interacts with their familiar personal communication device to conduct a transaction as opposed to user interfaces that vary among retail fueling environments due to factors, such as brand and the fueling device manufacturer. Although not required by the present invention, providing the ability for the user interface to be provided on the customer's personal communication device can allow for device manufacturers to either scale back or altogether eliminate the built-in user interface, thereby reducing costs as well.

A personal communication device as used herein includes any communication device usable by a customer within a retail fueling environment to effect communications. For example, a personal communication device includes wireless devices, such as a cell phone or personal digital assistant. A personal communication device may further be mobile, fixed in location, handheld, attached to the customer, and may be located within or associated with a vehicle. Accordingly, any device capable of use by a customer within a retail fueling environment for communication purposes is considered a personal communication device within the scope of the present application.

An application specific user interface, referred to herein as a customized transaction application (CTA), is downloaded to a customer's personal communication device, either as a stand-alone application or as a user interface to a server-based application. The CTA allows the customer to perform transaction processing in the customer's native language within a retail fueling environment located anywhere in the world. The CTA maintains customer transaction preferences, including the customer's preferred fuel grade and whether the customer wishes to receive a receipt. This allows the customer to complete transactions within the retail fueling environment in an automated manner. By use of the present invention, the customer may avoid learning a new user interface when performing a transaction within a retail fueling environment that the customer is visiting for the first time.

Because the customer's personal communication device can be linked to a particular user and/or their preferences, the user interface can be customized based on a variety of factors.

For example, the user interface can be customized based on the individual specifications of the fuel dispensers and/or can be customized based on the user's predefined preferences.

Within a first embodiment, the customer initiates a transaction at a fuel dispenser by obtaining a code from a fuel dispenser. The code identifies the fuel dispenser at which the customer is initiating the transaction and/or the retail fueling environment within which the fuel dispenser is located. The code may include an alpha, numeric, or alphanumeric code. The code may also include a graphically depicted barcode or two-dimensional array encoded with an encoding format suitable for representing identifiers for a fuel dispenser and/or a retail fueling environment. Additionally, the code may include a digital or analog sequence or packet of information received at the customer's personal communication device from the fuel dispenser or another module within the retail fueling environment via wireless connectivity, such as cellular or Bluetooth communication.

In one embodiment, the customer takes a digital picture of a mobile code (MCode) associated with the fuel dispenser using a camera associated with the customer's personal communication device. The personal communication device processes the MCode to extract fuel dispenser and retail fueling environment identifiers encoded within the MCode. Once the fuel dispenser and retail fueling environment identifiers are extracted from the MCode, the personal communication device either triggers a CTA that is resident on the personal communication device that is capable of interacting with the specified fuel dispenser and retail fueling environment, downloads an appropriate CTA from the fuel dispenser or from a local or remote application server, or initiates transaction processing with a server-based CTA. In order to download a CTA, the customer's personal communication device may be provided with a uniform resource locator (URL) from the fuel dispenser or from a local or remote application server that identifies a location from which to download the CTA or a user interface for a server-based CTA. Alternatively, the customer's personal communication device may be provided with instructions for establishing a data link for downloading the CTA.

The CTA may include a generic high-level processing engine that communicates with plug-in-style modules. These plug-in modules are adapted for communication with, and user interface processing for, different fuel dispensers located within different retail fueling environments. In this way, new fuel dispenser interaction components may be added to the CTA without extensive rework of the CTA. For example, when a customer is traveling, fuel dispenser types and user interfaces may be significantly different from those used near the customer's home. As such, CTA modules that are not needed or stored within local or remote servers proximate to the customer's home may be downloaded as needed when the customer initiates a transaction while traveling.

Transaction authorization may be performed in a variety of ways. For example, the customer may specify use of pre-paid minutes associated with the customer's personal communication device to effect payment. Alternatively, a point of sale (POS) within the retail fueling environment or a remote transaction server may be used for transaction processing by wireless communication with the customer's personal communication device. The wireless communication for either CTA download or transaction processing may be performed, for example, by local Bluetooth wireless connectivity for local communications, by cellular, or by other wireless connectivity between a serving entity and the customer's personal communication device for remote communications.

In an alternative embodiment, fraud may be prevented by utilizing global positioning system (GPS) functionality associated with the customer's personal communication device to verify that the customer is truly located at the fuel dispenser associated with the code that has been obtained from the fuel dispenser. By utilizing GPS verification, persons attempting to perpetuate fraud will be prevented from placing a code on a fuel dispenser at the retail fueling environment at which the customer is attempting to complete a transaction that is actually associated with a fuel dispenser located at another retail fueling environment. As such, the system will ensure that the fuel dispenser at which the customer is attempting to authorize a transaction is actually located within the retail fueling environment where the customer is located.

In another alternative embodiment, customer preferences may be created and preserved to allow the customer to customize the transaction processing interface to allow repeatability of transaction processing with limited customer interaction. Additionally, the customer profile may allow the customer to travel anywhere in the world and complete a transaction within a retail fueling environment without being required to know the native language at that location. For example, the customer may configure the CTA to utilize the customer's native language for interactions with the customer and to modify customer selections or preferences to accommodate user interface requirements of fuel dispensers automatically and without customer intervention. As such, a customer may utilize a common user interface for all transactions within a retail fueling environment independently of variations in user interface requirements of the fuel dispensers within the retail fueling environment.

In another embodiment, the present invention is adapted for use in older systems by use of a local server within the retail fueling environment to manage communications with the customer's personal communication device. For example, the local server may be used to download CTAs to the personal communication device, to provide links with which to download CTAs, and to provide wireless transaction management within the retail fueling environment.

In another embodiment, the present invention is adapted to provide transaction capabilities within legacy systems using the customer's personal communication device. Within this embodiment, the local server receives a transaction initiation request from the personal communication device, either via the wireless network or the Bluetooth wireless connectivity, and formats that request into legacy commands, such as a card swipe format, and provides those legacy commands to the deployed POS device to initiate the transaction. The local server may verify that the received request properly identifies the retail fueling environment and a fuel dispenser within that retail fueling environment prior to providing the legacy commands to the POS device. The POS device will then drive the identified fuel dispenser to allow fuel delivery. Upon completion of fueling, the local server will monitor the communications link between the POS device and the fuel dispenser for a receipt print message originating from the POS device. When the receipt print message is identified, the local server will translate this information into an electronic receipt and forward the electronic receipt to the customer's personal communication device, again via the wireless network or the Bluetooth wireless connectivity.

In another embodiment, the present invention provides for the customer to place an order for additional goods and/or services within the retail fueling environment. The customer initiates the ordering process by interrogating a code, such as taking a picture of a MCode, which identifies a vendor of the additional goods and/or services using the customer's personal communication device. The vendor may include a quick serve restaurant or a convenience store within the retail fueling environment, or may include a remote vendor of goods and/or services. The code used for instant ordering may be located within the retail fueling environment or elsewhere, such as on a bulletin board along the highway or within an airport terminal. As with other embodiments described herein, the customer's personal communication device extracts an identifier associated with the vendor from the code and invokes the CTA, which downloads and displays a menu of items that may be purchased from the vendor.

Alternatively, the menu may be stored on the customer's personal communication device and the CTA may verify that it has the latest version of the menu prior to presenting the menu to the customer on the customer's personal communication device. In either instance, information, such as language preference, may be used during the download process to select a menu that is represented in the customer's native language. The customer selects items from the menu and places an order using the CTA on the customer's personal communication device. Preferences may be stored within the customer's personal communication device to expedite future orders when the preferences adequately identify what the customer wishes to presently order (e.g., a hamburger, french fries, and a drink). The order is forwarded along with payment indicia and information identifying the customer's personal communication device via the wireless network or the Bluetooth wireless connectivity to the vendor for fulfillment. The payment indicia may include credit/debit card information, pre-paid minutes associated with a wireless or other account, a 1-900 number type of service to charge payment to a home telephone, or any other form of payment indicia.

In another embodiment, the present invention provides for the customer to receive a notification on the customer's personal communication device from the vendor indicating that an order which has been previously placed by the customer has been fulfilled. The vendor issues a notification to the customer, such as via the wireless network or the Bluetooth wireless connectivity, indicating that the order is ready for pickup. The notification may be in the form of a text message, a ring tone such as the vendor's advertising jingle, or the vendor may directly call the customer by dialing a telephone number that is associated with the customer's personal communication device. The notification process may be automated to provide the vendor with a notification method based upon the initial order and the identifying information associated with the customer's personal communication device that was forwarded with the initial order.

In another embodiment, the present invention provides for the customer to receive content, such as awards, loyalty points, advertising promotions, contest notifications, and electronic receipts on the customer's personal communication device. The content delivered to the customer's personal communication device may be dynamically chosen based upon the customer's age, income, or other relevant consideration. The customer may further define the type of content that is to be received by defining marketing preferences. Within this embodiment, identifiers that identify the fuel dispenser and/or the retail fueling environment are extracted from a code and are forwarded along with an identifier associated with the customer's personal communication device to a remote system. The remote system examines the received identifiers and determines the content to be provided to the customer, specifically tailored to the customer and the retail fueling environment. The content is forwarded to the customer's personal communication device or the fuel dispenser within the retail fueling environment for display. The customer may instruct the fuel dispenser, via a key press either on the personal communication device or on the fuel dispenser, to print a receipt including the offer.

Additionally, the customer may show the content displayed on the personal communication device to an attendant of the retail fueling environment to receive the offered item or discount represented by the content. The customer may further specify that the receipt is to be forwarded to a server or account for later retrieval and processing. A uniform resource locator (URL) may be provided to the customer, which when selected, provides an interface with which to specify the form of receipt for the transaction, such as printed on the fuel dispenser or electronic, and whether to deliver the receipt to the customer's personal communication device or to an account for later processing.

The customer may choose to convey the receipt and/or the reward contained therein to another person via either the printed receipt or an electronic communication, such as an email or text-based communication, of the content to the other person. The other person may then retrieve the product from the designated URL by selecting a link within the electronic receipt or by scanning a code associated with the purchase on the printed receipt, such as a MCode for example.

Once an electronic receipt has been generated, the customer or other person may import the receipt into financial software, expense reports, or rebate forms. Additionally, a printed receipt may be printed with conductive ink, such as radio frequency identification (RFID) ink, and the customer's personal communication device may be used to scan the RFID ink to convert the receipt to electronic form.

Alternatively, the content may include a URL that returns a picture of the content, such as a picture of a free drink. The customer may respond by selecting the URL, which may present the customer with additional purchase options. For example, the customer may purchase a ring tone or sound recording. When a product, such as a ring tone or sound recording, is purchased, the customer receives a receipt for the transaction and may request either a printed or electronic format for the receipt. A unique URL may be created for each item of content delivered to or purchased the customer. The unique URL for the purchase may be destroyed after the product is retrieved.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

Figure 1:
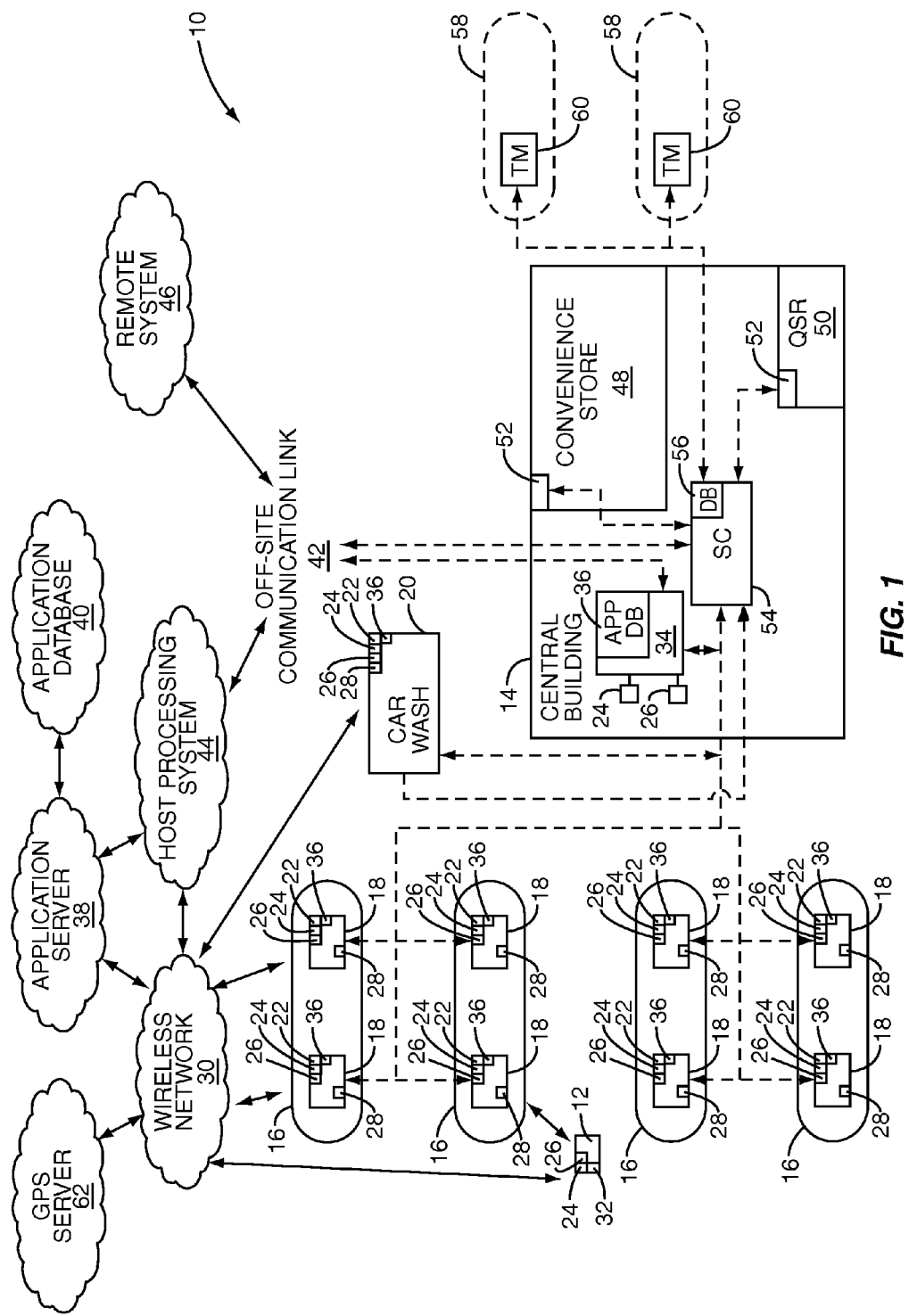
FIG. 1 is a schematic diagram of an exemplary retail fueling environment in accordance with disclosed embodiments of the present invention to provide a user having a personal communication device with the ability to complete transactions within a retail fueling environment using the personal communication device.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides an application specific user interface on a customer's personal communication device, such as a cell phone or personal digital assistant, for conducting transactions with fuel dispensers. The customer, by interacting with the application specific user interface on their personal communication device, as opposed to the built-in standard user interface on a fuel dispenser, provides input and receives output to conduct a transaction. In this manner, the customer interacts with their familiar personal communication device to conduct a transaction as opposed to user interfaces that vary among retail fueling environments due to factors, such as brand and the fueling device manufacturer. Although not required by the present invention, providing the ability for the user interface to be provided on the customer's personal communication device can allow for device manufacturers to either scale back or outright eliminate the built-in user interface, thereby reducing costs as well.

A personal communication device as used herein includes any communication device usable by a customer within a retail fueling environment to effect communications. For example, a personal communication device includes wireless devices, such as a cell phone or personal digital assistant. A personal communication device may further be mobile, fixed in location, handheld, attached to the customer, and may be located within or associated with a vehicle. Accordingly, any device capable of use by a customer within a retail fueling environment for communication purposes is considered a personal communication device within the scope of the present application.

An application specific user interface, referred to herein as a customized transaction application (CTA), is downloaded to a customer's personal communication device, either as a stand-alone application or as a user interface to a server-based application. The CTA allows the customer to perform transaction processing in the customer's native language within a retail fueling environment located anywhere in the world. The CTA maintains customer transaction preferences, including the customer's preferred fuel grade and whether the customer wishes to receive a receipt. This allows the customer to complete transactions within the retail fueling environment in an automated manner. By use of the present invention, the customer may avoid learning a new user interface when performing a transaction within a retail fueling environment that the customer is visiting for the first time.

Because the customer's personal communication device can be linked to a particular user and/or their preferences, the user interface can be customized based on a variety of factors. For example, the user interface can be customized based on the individual specifications of the fuel dispensers and/or can be customized based on the user's predefined preferences.

The present invention is discussed in particular beginning with FIG. 3 below. However, a discussion of an exemplary retail fueling environment and fuel dispenser components for conducting transactions is first discussed and illustrated in FIGS. 1 and 2.

FIG. 1 is a schematic diagram of an exemplary retail fueling environment 10 in accordance with disclosed embodiments of the present invention. The retail fueling environment 10 provides a user having a personal communication device 12 the ability to download and use a CTA to complete transactions within the retail fueling environment 10 using the personal communication device 12. The retail fueling environment 10 includes a central building 14, a plurality of fueling islands 16, each including multiple fuel dispensers 18, and a car wash 20. As will be described in more detail below, the fuel dispensers 18 and the car wash 20 include components to facilitate interaction with the user via the personal communication device 12 to complete transactions within the retail fueling environment 10.

The fuel dispensers 18 and the car wash 20 each include a control system 22, a cellular antenna 24, a Bluetooth antenna 26, and at least one code 28. The cellular antenna 24 enables the fuel dispensers 18 and the car wash 20 to communicate with a wireless network 30 for CTA location and downloading, transaction processing, and for other related transaction activities, as will be described in more detail below. The Bluetooth antenna 26 enables the fuel dispensers 18 and the car wash 20 to communicate with the personal communication device 12 for transaction-related interactions, including CTA downloading and transaction processing.

As described above, the code 28 identifies the fuel dispenser 18 at which the customer is initiating the transaction and/or the retail fueling environment 10 within which the fuel dispenser 18 is located. The code 28 may include an alpha, numeric, or alphanumeric code. The code may also include a graphically depicted barcode or two-dimensional array encoded with an encoding format suitable for representing identifiers for a fuel dispenser 18 and/or a retail fueling environment 10. Additionally, the code 28 may include a digital or analog sequence or packet of information received at the customer's personal communication device 12 from the fuel dispenser 18 or another module within the retail fueling environment 10 via wireless connectivity, such as via the cellular antenna 24 or the Bluetooth antenna 26.

As will be described in more detail in association with several of the embodiments described herein, the code 28 allows a user of the personal communication device 12 to initiate transaction processing for a purchase of fuel and other goods and/or services within the retail fueling environment 10. By interrogating the code, such as by taking a picture of the code 28 associated with the fuel dispenser 18 with the personal communication device 12, the code 28 is used to identify the fuel dispenser 18 and the retail fueling environment 10. There are many approaches to identifying the fuel dispenser 18 and the retail fueling environment 10, all of which are considered within the scope of the subject matter described herein. For example, wireless communication, taking a digital picture of the code 28, and manual entry of the code 28 may be used to identify the fuel dispenser 18 and the retail fueling environment 10. The identification of the fuel dispenser 18 and the retail fueling environment 10 enables the personal communication device 12 to trigger a CTA 32 that is resident on the personal communication device 12.

Alternatively, if the CTA 32 is not resident on the personal communication device 12, the CTA 32 may be downloaded from the fuel dispenser 18 or from a local or a remote source, as will be described in more detail below. Updates to a CTA 32 that is resident on the personal communication device 12 may also be downloaded from the fuel dispenser 18 or from the local or remote source when updates to the CTA 32 are available. Once activated, the CTA 32 may be used to perform authorization of a transaction via the personal communication device 12. The transaction may be authorized by use of pre-paid minutes associated with the personal communication device 12, or by either local or remote authorization, as will also be described in more detail below. By providing the user of the personal communication device 12 with the CTA 32, transaction processing within the retail fueling environment 10 may be improved.

A local application server 34, including a local application database 36, is located within the central building 14 and provides for storage and retrieval of CTAs, such as the CTA 32, plug-ins for the CTA 32, and related information. It should be noted that the local application server 34 and the local application database 36 may be located elsewhere within the retail fueling environment 10. The local application server 34 includes a cellular antenna 24 to facilitate communication with a remote application server 38 via the wireless network 30 to access application specific user interfaces for download and update, and to facilitate communication with other modules for transaction processing. The local application server 34 also includes a Bluetooth antenna 26 to facilitate communication with the personal communication device 12 and the fuel dispenser 18 or car wash 20 for transaction processing. The remote application server 38 includes a remote application database 40 for storage and retrieval of CTAs, such as the CTA 32, plug-ins for the CTA 32, and related information.

Alternatively, the local application server 34 may communicate with the remote application server 38, via an off-site communication link 42 and a host processing system 44, for accessing CTAs, such as the CTA 32, plug-ins for the CTA 32 and related information. The off-site communication link 42 also allows communication with a remote location for credit/debit card authorization via the host processing system 44 and/or a remote system 46. The remote system 46 represents another computer, system, or device that can be used to access identification information, such as credit card and/or fingerprint data. The off-site communication link 42 may be routed through the Public Switched Telephone Network (PSTN), the Internet, both, or the like, as needed or desired. The local application server 34 may additionally communicate with the host processing system 44 and other modules via the cellular antenna 24 and the wireless network 30 for transaction processing.

It should be noted that the central building 14 need not be centrally located within the retail fueling environment 10, but rather is the focus of the retail fueling environment 10, and may house a convenience store 48 and/or a quick serve restaurant (QSR) 50 therein. Both the convenience store 48 and the QSR 50 may include point-of-sale (POS) devices 52.

The central building 14 further includes a site controller (SC) 54, which in an exemplary embodiment may be the G-SITE® sold by Gilbarco Inc. of Greensboro, N.C. or other third party site controller. The site controller 54 may control the authorization of fueling transactions and other conventional activities, as is well understood. The site controller 54 may be incorporated into a POS device, such as the POS devices 52, if needed or desired, such that the site controller 54 also acts as a POS device.

The site controller 54 includes a database (DB) 56 capable of storing identification and authorization indicia. This identification and authorization indicia may be used to identify an individual making a programming request at any POS device, such as the POS devices 52, within the retail fueling environment 10. This identification of the individual may include use of biometric information or other data. The identification and authorization indicia may also be used to authenticate the programming request from that individual by use of passwords or other information, such as an employee identification number or fingerprint, that may be entered at the POS terminal during a programming request sequence. The identification and authentication indicia, such as the fingerprint or employee identification number, may also be documented on a per-authorization basis to record which of the authorized personnel changed the programming.

Further, the site controller 54 may utilize the off-site communication link 42 for communication with a remote location for credit/debit card authorization via the host processing system 44 and/or the remote system 46, as described above. It should be noted that the car wash 20, the convenience store 48, and the QSR 50 are all optional and need not be present in a given retail fueling environment.

As described above, the plurality of fueling islands 16 may have one or more fuel dispensers 18 positioned thereon. The fuel dispensers 18 and the POS devices 52 are in electronic communication with one another and with the local application server 34 and the site controller 54 through a Local Area Network (LAN), pump communication loop, or other communication channel or line, or the like.

The retail fueling environment 10 also has one or more underground storage tanks (USTs) 58 adapted to hold fuel therein. As such, the USTs 58 may be double-walled USTs. Further, each UST 58 may include a liquid level sensor or other sensor (not shown) positioned therein. The sensors may report to a tank monitor (TM) 60 associated therewith. The tank monitor 60 may communicate with the fuel dispensers 18 (either through the site controller 54 or directly, as needed or desired) to determine amounts of fuel dispensed, and compare fuel dispensed to current levels of fuel within the USTs 58 to determine if the USTs 58 are leaking. In a typical installation, the tank monitor 60 is also positioned in the central building 14, and may be proximate to the site controller 54. The tank monitor 60 may communicate with the site controller 54 for leak detection reporting, inventory reporting, or the like.

A global positioning system (GPS) server 62 allows access to location information for the personal communication device 12. The location information may be accessed via the wireless network 30 by the fuel dispenser 18, the car wash 20, and the local application server 34. The location information may be used to verify that the user of the personal communication device 12 is actually located proximate to the fuel dispenser 18 or car wash 20 within the retail fueling environment 10 that is associated with a transaction requested by the user. In this way, fraud may be prevented by prohibiting transaction initiation by use of the code 28 that is actually associated with a fuel dispenser located within a different retail fueling environment.

Figure 2:
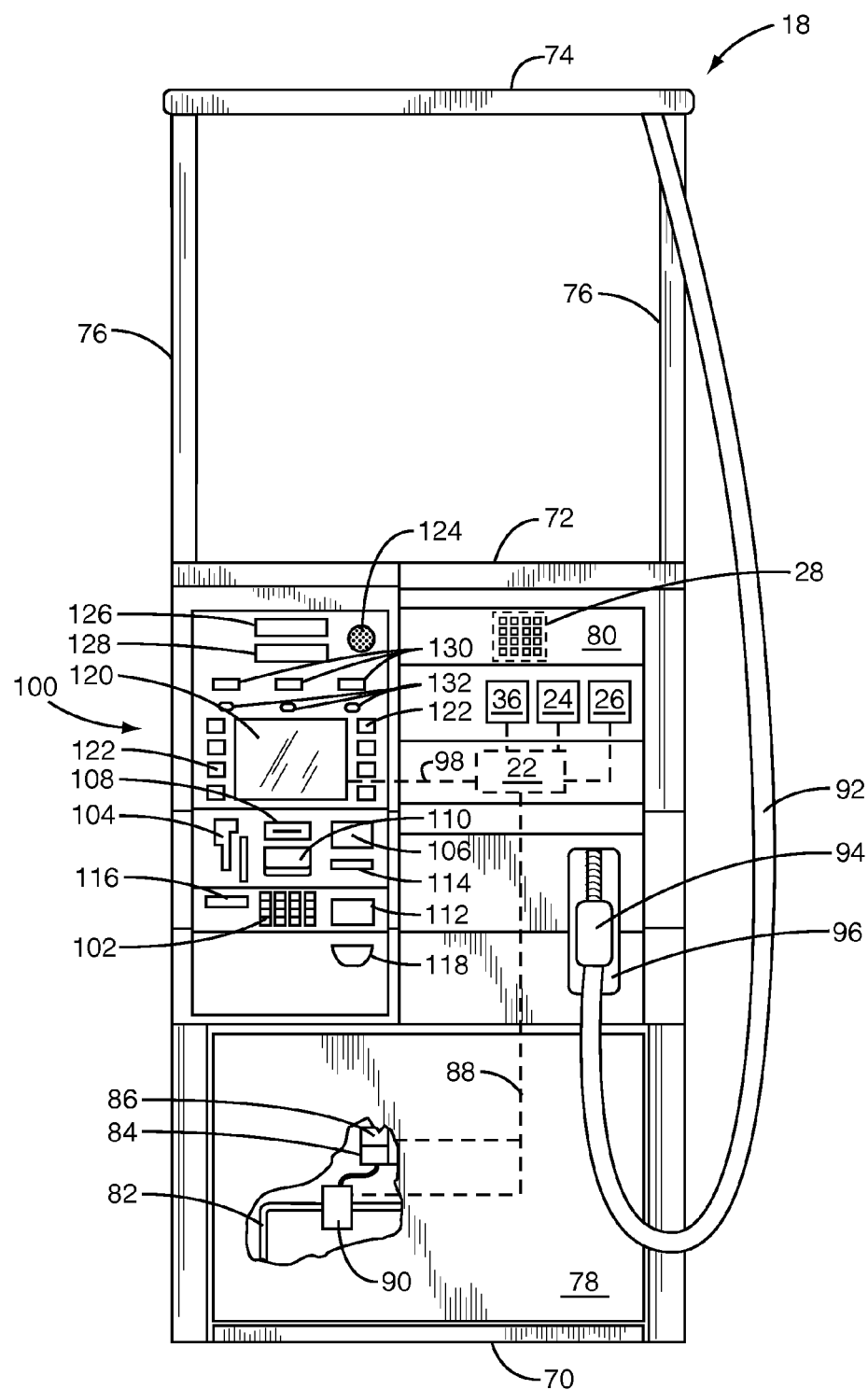
FIG. 2 illustrates a detailed view of an exemplary fuel dispenser that operates in conjunction with a personal communication device to provide transaction processing via the personal communication device according to an embodiment of the subject matter described herein.

FIG. 2 illustrates a detailed view of an exemplary fuel dispenser 18 that operates in conjunction with the personal communication device 12 to provide transaction processing via the personal communication device 12. The fuel dispenser 18 includes the control system 22, the cellular antenna 24, the Bluetooth antenna 26, and the code 28. As described above, the code 28 identifies the fuel dispenser 18 at which the customer is initiating the transaction and/or the retail fueling environment 10 within which the fuel dispenser 18 is located. The code 28 may include an alpha, numeric, or alphanumeric code. The code 28 may also include a graphically depicted two-dimensional array encoded with an encoding format suitable for representing identifiers for a fuel dispenser 18 and/or a retail fueling environment 10. Additionally, the code 28 may include a digital or analog sequence or packet of information received at the customer's personal communication device 12 from the fuel dispenser 18 or another module within the retail fueling environment 10 via wireless connectivity, such as via the cellular antenna 24 or the Bluetooth antenna 26.

As will be described in more detail below, in one embodiment, the code 28 is represented as a two-dimensional encoded array, termed a mobile code (MCode) 28, and the personal communication device 12 initiates transaction processing by taking a digital picture of the MCode 28. When transaction processing is initiated in this way, the personal communication device 12 will then extract identifiers associated with the fuel dispenser 18 and the retail fueling environment 10 from the MCode 28 to identify the fuel dispenser 18 and the retail fueling environment 10. The personal communication device 12 may also communicate with the control system 22 of the fuel dispenser 18 or with another module within the retail fueling environment 10 via the cellular antenna 24 and/or the Bluetooth antenna 26 to facilitate CTA downloading and transaction processing.

The fuel dispenser 18 has a base 70 and a top 72, with a canopy 74 supported by two side panels 76. The fuel dispenser 18 is subdivided into multiple compartments. A hydraulic area 78 is used to enclose hydraulic components and an electronic area 80 is used to enclose electronic components. A vapor barrier (not shown) may be used to separate the hydraulic area 78 from the electronic area 80.

Several components used to control fuel flow may be housed within the hydraulic area 78. Fuel from USTs 58 (FIG. 1) is pumped through a piping network into inlet or fuel dispensing pipes. An inlet pipe 82 provides a piping network from an UST.

When fuel is dispensed, fuel begins to travel through a meter 84, which is responsive to flow rate or volume. A pulser 86 is employed to generate a signal in response to fuel movement through the meter 84. Control/data lines 88 provide a signaling path from the pulser 86 to the control system 22. The control/data lines 88 provide signals to the control system 22 indicative of the flow rate or volume of fuel being dispensed within the meter 84. The control/data lines 88 may provide control signaling to a valve 90 that may be opened and closed to dispense and terminate dispensing of fuel, respectively.

The control system 22 includes a controller and control circuitry (not shown) for controlling access to a programming mode of operation, as will be described in more detail below. The control system 22 also controls transaction-level and functional processing within the fuel dispenser 18 by collecting meter flow measurements from the pulser 86, performing calibration operations associated with the meter 84, and performing calculations such as cost associated with a fuel dispensing transaction. Additionally, the control system 22 interfaces via the cellular antenna 24 and/or the Bluetooth antenna 26 with the personal communication device 12 and servers, such as the local application servers 34, the remote application server 38, and the GPS server 62, to control transactional processing for the fuel dispenser 18, as will be described in more detail below.

As fuel is dispensed from the fuel dispenser 18, the control system 22 receives signaling from the pulser 86 associated with the meter 84 described above during the dispensing transaction. In response to receipt of signaling from the pulser 86, the control system 22 provides transaction-level functionality within the fuel dispenser 18. The control system 22 collects, either directly or indirectly, meter flow measurements associated with the meter 84.

As a dispensing transaction progresses, fuel is then delivered to a hose 92 and through a nozzle 94 into the customer's vehicle (not shown). The fuel dispenser 18 includes a nozzle boot 96, which may be used to hold and retain the nozzle 94 when not in use. The nozzle boot 96 may include a mechanical or electronic switch (not shown) to indicate when the nozzle 94 has been removed for a fuel dispensing request and when the nozzle 94 has been replaced, signifying the end of a fueling transaction. A control line (not shown) provides a signaling path from the electronic switch to the control system 22. The control system 22 uses signaling received via the control line in order to make a determination as to when a transaction has been initiated or completed.

The control system 22 uses control/data lines 98 to interface to a user interface 100 that includes various combinations of subsystems to facilitate customer interaction with the fuel dispenser 18. The user interface 100 may include a keypad 102. The keypad 102 may be used for selection of different types of purchase transactions available to the customer or to enter an authentication code. The keypad 102 may also be used for entry of a personal identification number (PIN) if the customer is using a debit card for payment of fuel or other goods and/or services.

The user interface 100 may also contain a magnetic strip card reader 104 for insertion of credit, debit or other magnetic strip cards for payment. Additionally, the magnetic strip card reader 104 may accept loyalty or program-specific cards that entitle the customer to a fixed credit, percentage discount, or other favorable pricing on fuel or other goods and/or services.

The user interface 100 may also include a radio-frequency (RF) antenna 106. The RF antenna 106 is coupled to an RF interrogator (not shown). If, for example, the customer is tendering a radio frequency identifier (RFID) for payment of a car wash, the RF antenna 106, as controlled by the RF interrogator, will generate a field to interrogate the customer's RFID. The RFID and the RF antenna 106 will communicate using RF communications to identify the customer's account or other payment information. For more information on RFID payments and interaction at a fuel dispenser, see U.S. Pat. No. 6,073,840, entitled "Fuel Dispensing and Retail System Providing for Transponder Prepayment" to Marion issued Jun. 13, 2000, which is incorporated herein by reference in its entirety.

The user interface 100 may also include other payment or transactional devices to receive payment information for transaction processing associated with transactions, including a bill acceptor 108, an optical reader 110, a smart card reader 112, and a biometric reader 114. The user interface 100 also includes a receipt printer 116 so that a receipt with a recording of the transaction carried out at the fuel dispenser 18 may be generated and presented to the customer. A change delivery device 118 may also be used to deliver change for overpayment to a customer. A display 120 is used to provide information, such as transaction-related prompts and advertising, to the customer. It should be noted that the MCode 28 may alternatively be displayed on the display 120 rather than on a face of the fuel dispenser 18. Displaying the MCode 28 on the display 120 allows modifications and/or field upgrades to the MCode and/or identifier technology via a software-type download. A user may still take a picture of the MCode 28 via the personal communication device 12 on the display 120. Additionally, as will be described in more detail below, a perpetrator of fraud may place a decal of a MCode that is actually associated with a remote fuel dispenser onto the fuel dispenser 18 in an attempt to gain authorization for the remote fuel dispenser when a customer attempts to perform a transaction at the fuel dispenser 18. By providing the MCode 28 on the display 120, which is controlled by the control system 22, fraud in the use of MCode authorization may be prevented.

Soft keys 122 are used by the customer to respond to information requests presented to the user via the display 120. An intercom 124 is provided to generate audible cues for the customer and to allow the customer to interact with an operator or attendant.

In addition, the fuel dispenser 18 includes a transaction price total display 126 that may be used to present the price to be charged to the customer for fuel that is dispensed. A transaction gallon total display 128 may be used to present the customer with the measurement of fuel dispensed in units of gallons or liters as a volume of fuel dispensed from the fuel dispenser 18. Octane selection buttons 130 are provided for the customer to select which grade of fuel is to be dispensed before dispensing is initiated. Price per unit (PPU) displays 132 are provided to show the price per unit of fuel dispensed in either gallons or liters, depending upon the programming of the fuel dispenser 18.

The present invention provides a customer of the retail fueling environment 10 with the ability to conduct a transaction with the fuel dispenser 18 by interacting with an application specific user interface on the customer's personal communication device 12. The customer, by interacting with the application specific user interface on their personal communication device, as opposed to the built-in standard user interface on a fuel dispenser, provides input and receives output to conduct the transaction. In this manner, the customer interacts with their familiar personal communication device 12 to conduct the transaction as opposed to user interfaces that vary among retail fueling environments due to factors, such as brand and the fueling device manufacturer. FIG. 3 below begins a detailed discussion of the present invention.

Figure 3:
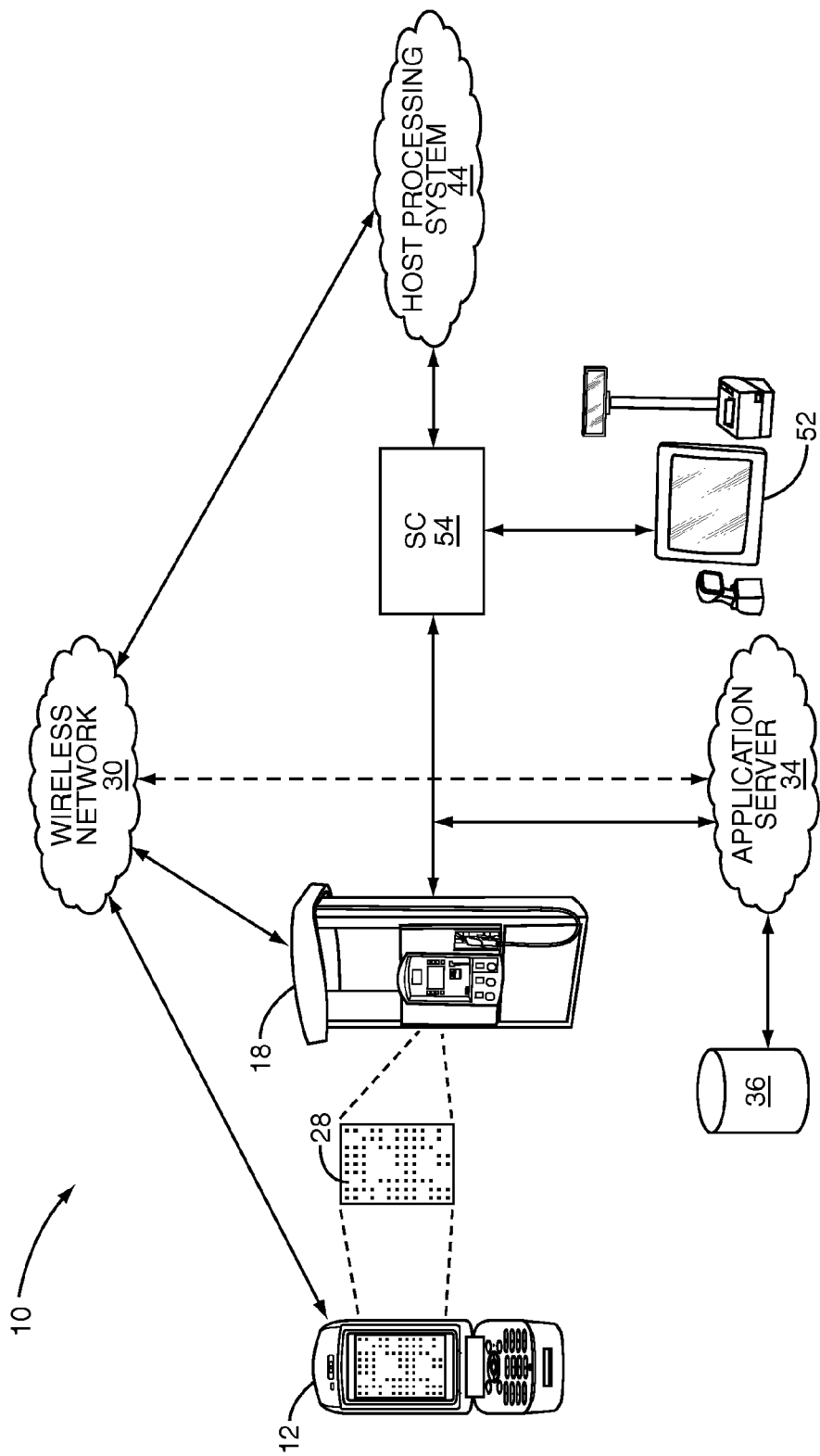
FIG. 3 illustrates a more detailed view of the retail fueling environment depicted in FIG. 1 to better illustrate the interactions between a personal communication device and other components within the retail fueling environment for transaction processing by use of the personal communication device according to an embodiment of the subject matter described herein.

FIG. 3 illustrates a more detailed view of the retail fueling environment 10 depicted in FIG. 1 to better illustrate the interactions between the personal communication device 12 and other components within the retail fueling environment 10 for transaction processing initiated by use of the personal communication device 12. According to the present invention, as can be seen from FIG. 3, the personal communication device 12 is shown capturing the MCode 28 and the specific kind of code from the fuel dispenser 18. As described above, the personal communication device 12 may capture the MCode 28 by taking a picture of the MCode 28 present as a decal on the face of the fuel dispenser 18. Alternatively, the MCode 28 may be displayed on a display, such as the display 120, of the fuel dispenser 18.

As used herein, the term MCode refers to a two-dimensional encoded array that may be captured via a camera or scanner on the personal communication device 12. An example of the MCode 28 is provided by Nextcode Corporation, of 2352 Main St., Suite 304, Concord, Mass. 01742, accessible via http://www.connexto.com/.

The fuel dispenser 18 is shown to be in communication with the site controller 54. The site controller 54 may access the host processing system 44 for transaction processing. Transaction authorization may be performed by POS, such as the POS devices 52, in communication with the site controller 54 and the fuel dispenser 18.

The wireless network 30 interconnects the personal communication device 12, the fuel dispenser 18, the host processing system 44, and the local application server 34. As described above, the local application server 34 includes the local application database 36 that may be used to locally store application specific user interfaces, such as the CTA 32, plug-ins for the CTA 32, and related information.

Figure 4:
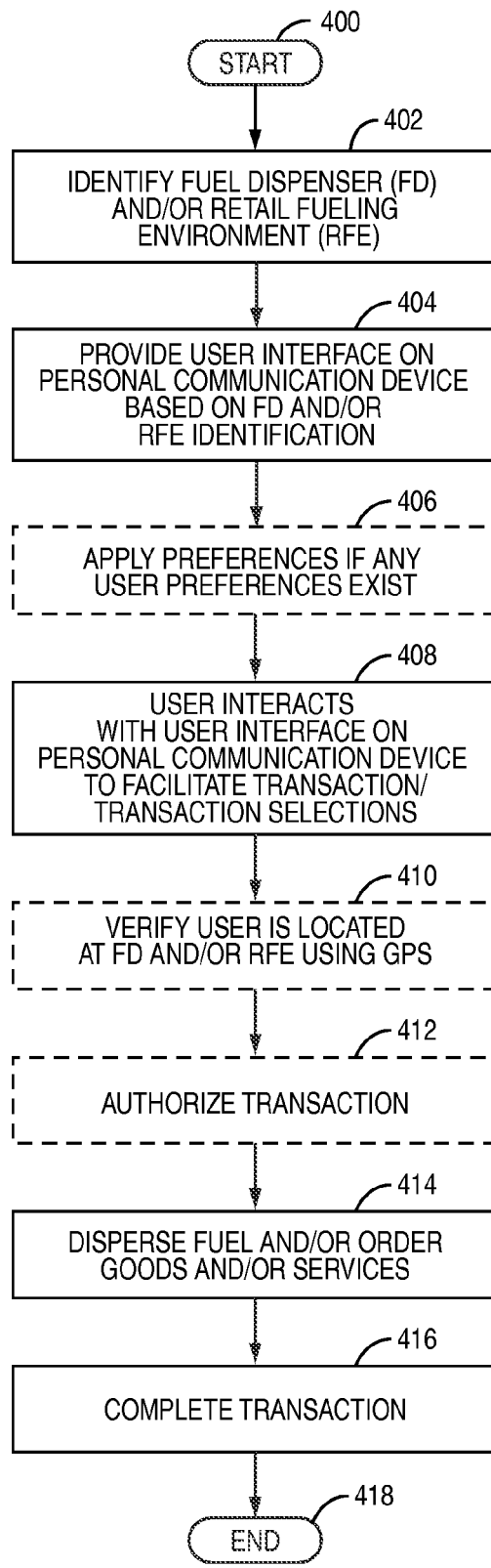
FIG. 4 illustrates an exemplary process by which transaction processing may be performed by use of a personal communication device within a retail fuel environment for the purpose of performing transaction processing for the purchase of fuel, goods, and/or services according to an embodiment of the subject matter described herein.

Various embodiments of the present invention will now be described based upon the systems and architectures described in FIGS. 1-3. FIG. 4 below begins with a description of a high-level process that may be implemented using the customer's personal communication device 12 in conjunction with the system of FIG. 3 for transaction processing within the retail fueling environment 10.

FIG. 4 illustrates an exemplary process by which transaction processing may be performed by use of the personal communication device 12 within a retail fuel environment, such as the retail fueling environment 10, for the purpose of performing transaction processing for the purchase of fuel, goods, and/or services. The process begins (step 400) and identifies the fuel dispenser 18 and/or retail fueling environment 10 at which the transaction is to be initiated (step 402). The fuel dispenser 18 and/or retail fuel environment 10 are identified, for example, to allow selection of the appropriate CTA 32 and coordination of transaction processing activities, as will be described in more detail below. As described above, the user of the personal communication device 12 may identify the fuel dispenser 18 and retail fueling environment 10, for example, by taking a picture of an identifier or code 28, such as the MCode 28, by entering identifiers directly via a keypad on the personal communication device 12, and by communicating with the fuel dispenser 18 or other module within the retail fueling environment 10.

Once the fuel dispenser and retail fueling environment are identified, an application specific user interface, such as the CTA 32, is provided on the personal communication device 12 based on the fuel dispenser and/or retail fueling environment identification (step 404). As described above, the application specific user interface includes the CTA 32 that is executed on the personal communication device 12 and may also include a server-based executable application with the application specific user interface provided on the personal communication device 12.

If the user has previously defined any user preferences regarding transactions within the retail fueling environment 10, these preferences may be optionally applied (step 406). User preferences may be created by the user and stored, for example, within the personal communication device 12. The user preferences may then be used to automate transaction processing. For example, if the user consistently prefers a certain grade of fuel, this fuel grade preference may be stored. As such, when a transaction is initiated, the user preference for fuel grade may be applied to the transaction to automate transaction processing and decrease the number of interactions by the customer for completion of the transaction. Other preferences, such as payment method and receipt generation preferences may also be created and processed automatically without customer interaction during transaction processing. The user then interacts with the user interface on the personal communication device 12 to facilitate transactions/transaction selections (step 408). As described above, user preferences may be used to diminish the extent of the user interactions during a transaction and to expedite transaction processing.

When any preferences have been applied and the user has completed interaction with the user interface on the personal communication device 12, the process may verify that the user is located at the fuel dispenser 18 and/or retail fueling environment 10 using, for example, a GPS system such as the GPS server 62 (step 410). For example, when a perpetrator of fraud places a MCode decal that is actually associated with a different fuel dispenser and/or retail fueling environment over the MCode 28 on the fuel dispenser 18, this attempted fraud may be detected and prevented.

Fuel dispensers, such as the fuel dispenser 18, may be programmed for a variety of transaction authorization protocols or may be programmed to perform a transaction without prior authorization. Accordingly, the process may authorize a transaction (step 412). The process then dispenses fuel and/or orders additional goods and/or services as requested by the user (step 414). The process completes the transaction (step 416) and ends (step 418).

Alternative embodiments of the present invention will be described within the following sections which have been partitioned for ease of reference.

Personal Communication Device Application Specific User Interface Acquisition

Figure 5:
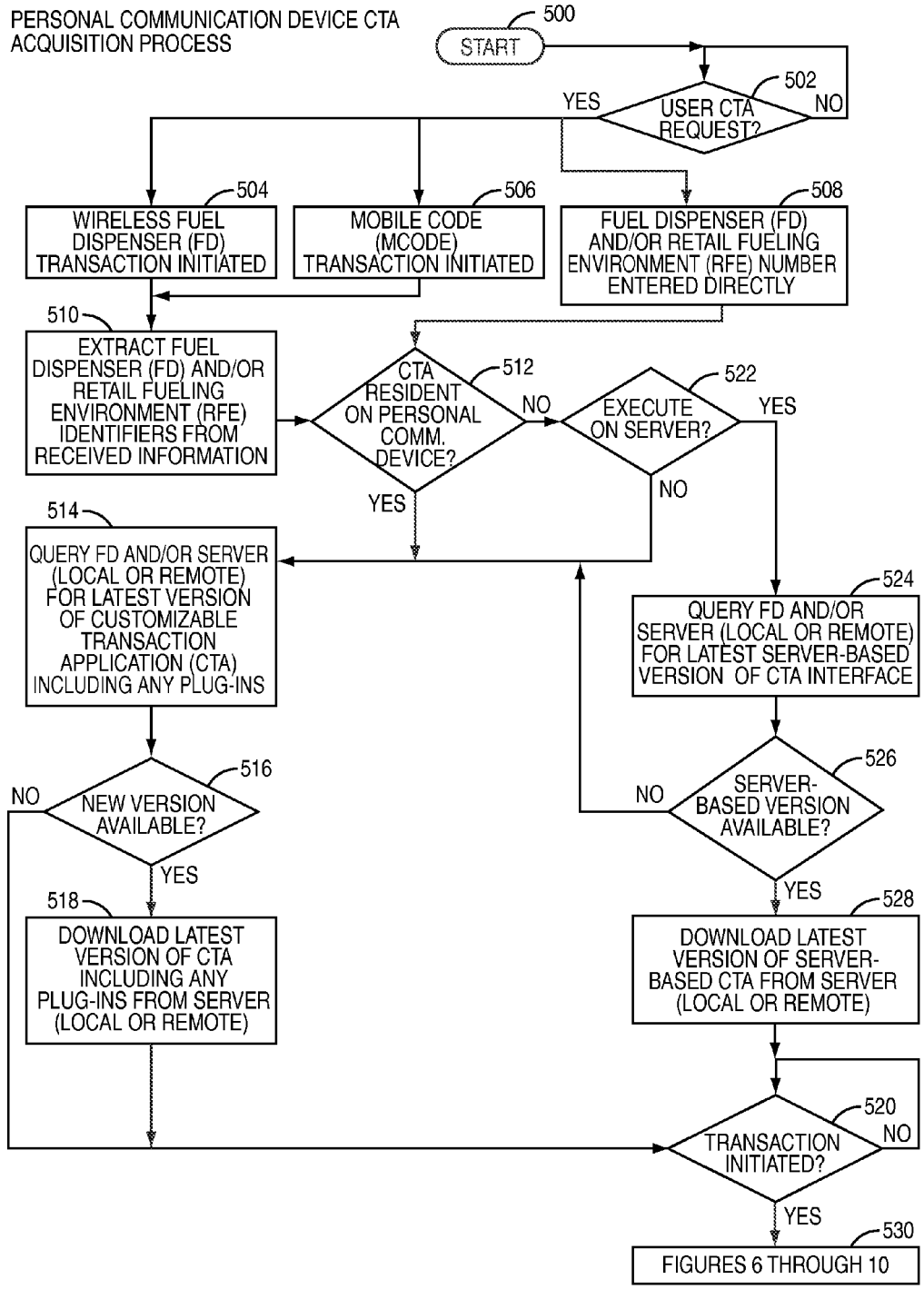
FIG. 5 illustrates an exemplary process by which a personal communication device may acquire a customizable transaction application (CTA) for transaction processing according to an embodiment of the subject matter described herein.

FIG. 5 illustrates an exemplary process by which the personal communication device 12 may acquire an application specific user interface, such as the CTA 32, for transaction processing. The process begins (step 500) and waits for user CTA requests (decision point 502). When a user CTA request has been received, the process determines which type of CTA request has been received. For example, the personal communication device 12 may initiate wireless communication with the fuel dispenser 18 via Bluetooth or some other protocol. Alternatively, as described above, the personal communication device 12 may take a picture of a MCode and initiate a transaction by identifying the fuel dispenser and retail fueling environment associated with the MCode. As another exemplary alternative, the user of the personal communication device 12 may directly enter a number that is found on the face of the fuel dispenser 18 that identifies the fuel dispenser and retail fueling environment at which the user is located. Accordingly, the process determines whether a wireless fuel dispenser transaction has been initiated (step 504), whether a MCode transaction has been initiated (step 506), or whether a fuel dispenser and/or retail fueling environment number has been entered directly (step 508).

When a wireless fuel dispenser transaction has been initiated, the personal communication device 12 and the fuel dispenser 18 may communicate information via Bluetooth, cellular, or some other wireless protocol. This information may include the fuel dispenser and/or retail fueling environment identifiers as described above in association with the MCode 28. Alternatively, the user of the personal communication device 12 may take a picture of the MCode 28 using a camera associated with the personal communication device 12. Accordingly, when either a wireless fuel dispenser transaction or a MCode transaction have been initiated, the process extracts the fuel dispenser and/or retail fueling environment identifiers from the received information (step 510). For example, an extracted fuel dispenser identifier may identify the fuel dispenser 18 and an extracted retail fueling environment identifier may identify the retail fueling environment 10. When the fuel dispenser and/or retail fueling environment identifiers have been extracted or when the fuel dispenser and/or retail fueling environment identifiers have been entered directly by the user, the process determines whether an application specific user interface, such as the CTA 32, associated with the identified fuel dispenser and/or retail fueling environment is resident on the personal communication device 12 (decision point 512).

When a determination is made that the CTA 32 is resident on the personal communication device 12, the process queries the fuel dispenser and/or a server, such as the local application server 34 or the remote application server 38, for the latest version of the CTA 32 including any plug-ins associated with the fuel dispenser and/or retail fueling environment at which the user is located (step 514). Because each retail fueling environment may have its fuel dispensers programmed with a slightly different user interface, the use of plug-ins in conjunction with the CTA 32 allows the CTA 32 to be adapted in real time to facilitate transaction management in a variety of retail fueling environments. In response to the query, a determination is made as to whether a new version of the CTA 32 and/or any associated plug-ins is available (decision point 516). If a new version of the CTA 32 and/or any associated plug-ins is available, the latest version of the CTA 32 including any associated plug-ins is downloaded from a server, such as the local application server 34 or the remote application server 38 (step 518). The process then waits for a transaction to be initiated (decision point 520).

When a determination is made that the CTA 32 is not resident on the personal communication device 12 (decision point 512), a determination is made as to whether to execute the CTA 32 on a server, such as the local application server 34 or the remote application server 38 (decision point 522). When a determination is made to execute the CTA 32 on a server, the process queries the fuel dispenser 18 and/or server, such as the local application server 34 or the remote application server 38, for the latest server-based version of a CTA interface that is executable on the personal communication device 12 (step 524). In response to the query, the process determines whether a server-based version of the CTA 32 is available (decision point 526). When either a server-based version of the CTA 32 is not available or when a determination is made not to execute the CTA 32 on a server, the process continues as described above to query for and download the latest version of the CTA 32 including any associated plug-ins. When a server-based version of the CTA 32 is available, the process downloads the latest version of the server-based CTA 32 from a server, such as the local application server 34 or the remote application server 38 (step 528). The process then waits for a transaction to be initiated as described above (decision point 520). When a transaction is initiated, the process performs CTA-based transaction processing using the personal communication device 12, as illustrated in FIGS. 6-10 (step 530).

Transaction Processing Using an Application Specific User Interface On a Personal Communication Device Use of an application specific user interface, such as the CTA 32, on a customer's personal communication device 12, provides several possible approaches to transaction processing within the retail fueling environment 10. FIGS. 6-10 provide exemplary transaction flow processing examples. It should be understood that the transaction flows depicted within FIGS. 6-10 are exemplary and that many other transaction flow processing approaches may be implemented without departure from the scope of the subject matter described herein. By use of an application specific user interface, such as the CTA 32, configured to operate on the customer's personal communication device 12, transaction processing may be performed in an automated fashion. The customer may initiate and conduct a transaction by use of the application specific user interface on the personal communication device 12.

Figure 6:
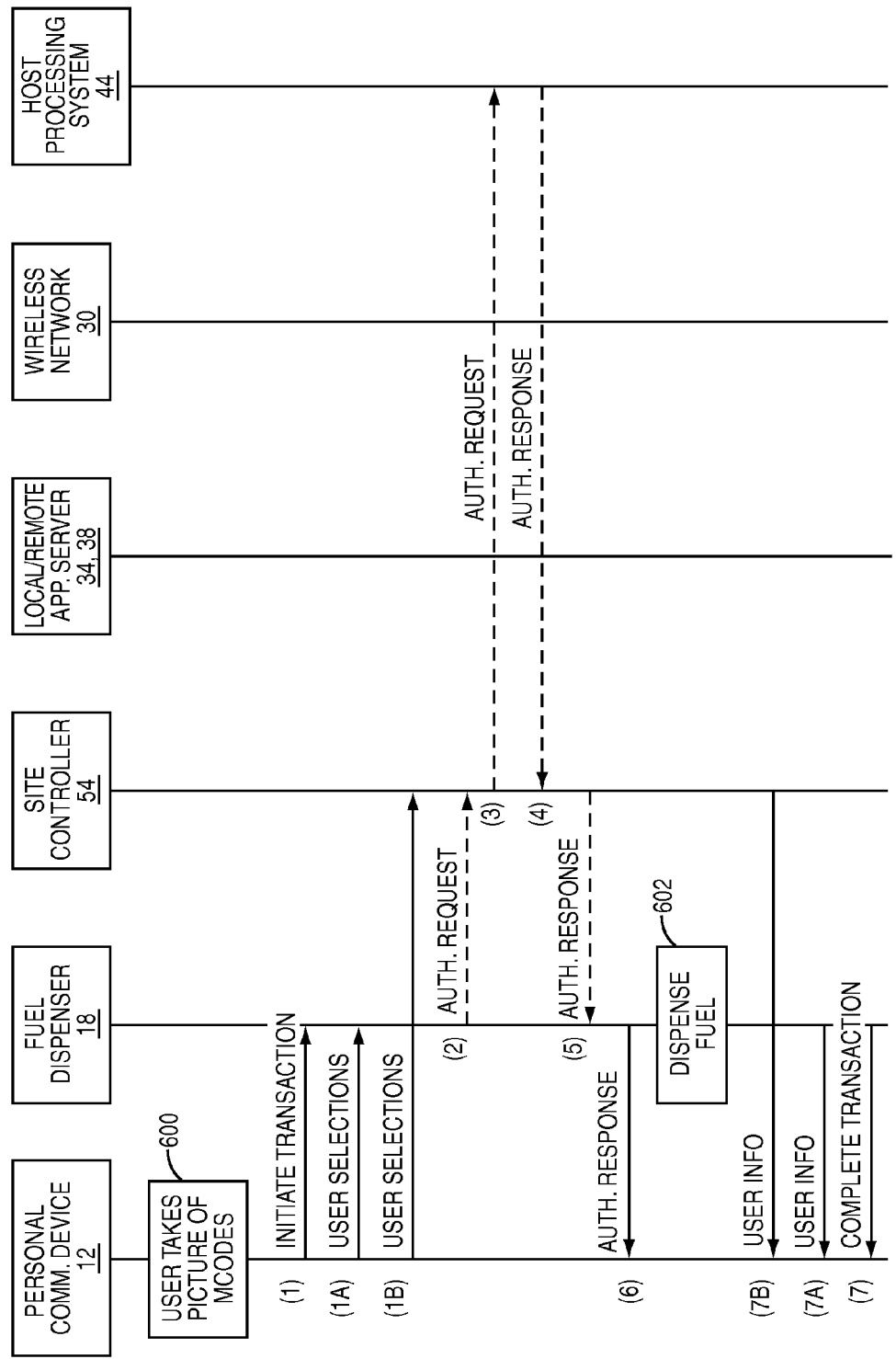
FIG. 6 illustrates an exemplary flow diagram for transaction processing where a personal communication device initiates a transaction within a retail fueling environment via communication with a fuel dispenser according to an embodiment of the subject matter described herein.

FIG. 6 illustrates an exemplary flow diagram for transaction processing where the personal communication device 12 initiates a transaction within the retail fueling environment 10 via communication with a fuel dispenser, such as the fuel dispenser 18. The communication between the personal communication device 12 and the fuel dispenser 18 may be performed, for example, using Bluetooth, cellular, or another wireless protocol. As can be seen from FIG. 6, the user of the personal communication device 12 takes a picture of a MCode 28 that is associated with the fuel dispenser 18 and/or the retail fueling environment 10 (block 600). As described above in association with FIG. 5, the personal communication device 12 extracts identifiers from the MCode 28 to identify the fuel dispenser 18 and/or the retail fueling environment 10, and downloads the latest version of a compatible application specific user interface, such as the CTA 32, including any plug-ins.

The personal communication device 12 initiates a transaction by communication with the fuel dispenser 18 (line 1). This transaction initiation may include communication of user preferences, such as payment or other information from the personal communication device 12 to the fuel dispenser 18. Additional user selections may be communicated between the personal communication device 12 and the fuel dispenser 18 and between the personal communication device 12 and the site controller 54 (lines 1A and 1B, respectively). The user selections may include alternate or additional processing instructions for the initiated transaction and may also include requests for additional goods and/or services that are available either within the retail fueling environment 10 or from other sources. For example, the user may wish to purchase groceries from a convenience store, such as the convenience store 48, within the retail fueling environment 10 or may wish to purchase tickets for a show or retrieve the latest weather forecast information from a remote location, such as the remote system 46. It should be noted that these user selections (lines 1A and 1B) may be performed at any point during the transaction and are illustrated after the transaction is initiated (line 1) for ease of illustration.

Depending upon the programming of the fuel dispenser 18, authorization may be required to initiate the transaction. Accordingly, an authorization request is issued from the fuel dispenser 18 to the site controller 54 (line 2) when the fuel dispenser 18 is programmed to issue an authorization request. In response to receiving the authorization request, the site controller 54 issues an authorization request to the host processing system 44 (line 3) and receives an authorization response from the host processing system 44 (line 4). In response to receipt of the authorization response from the host processing system 44, the site controller 54 issues an authorization response to the fuel dispenser 18 (line 5). The fuel dispenser 18 issues an authorization response to the personal communication device 12 (line 6) in response to the transaction initiation request (line 1).

As described above, the fuel dispenser 18 may be programmed to issue an authorization response without issuing an authorization request to another module, such as the site controller 54, or may issue an authorization response prior to issuing an authorization request to the site controller 54. As such, the fuel dispenser 18 may be programmed to concurrently authorize a response to the personal communication device 12 and issue an authorization request to the site controller 54 or other module. In this case, should the fuel dispenser 18 receive an authorization response denying authorization for the transaction, the fuel dispenser 18 may immediately terminate any further dispensing of fuel. Accordingly, the order of the authorization requests and authorization responses described above may be varied without departure from the scope of the subject matter described herein. Accordingly, the fuel dispenser 18 allows fuel to be dispensed (block 602) until the dispensing action is completed or an authorization response denying authorization for the transaction is received.

As with the user selections described above that are communicated between the personal communication device 12, the fuel dispenser 18, and/or the site controller 54 (lines 1A and 1B, respectively), user information may be provided by the site controller 54 and/or the fuel dispenser 18 to the personal communication device 12 (lines 7B and 7A, respectively). The user information provided by the site controller 54 and/or the fuel dispenser 18 may be in response to the user's selections or may be independent thereof and may also be provided at any point during the transaction processing. It should also be noted that the user selections (lines 1A and 1B) and user information (lines 7B and 7A) are available at any point during any embodiment of transaction processing described herein. Accordingly, the user selections and user information will not be described in further detail in association with FIGS. 7-10 for ease of illustration purposes. It is assumed that these user selections and user information may be provided within any embodiment described herein.

When all transaction processing is complete, the fuel dispenser 18 indicates to the personal communication device 12 that the transaction is complete (line 7). Additional information may be provided to the personal communication device 12, as will be described in association with additional embodiments below.

Figure 7:
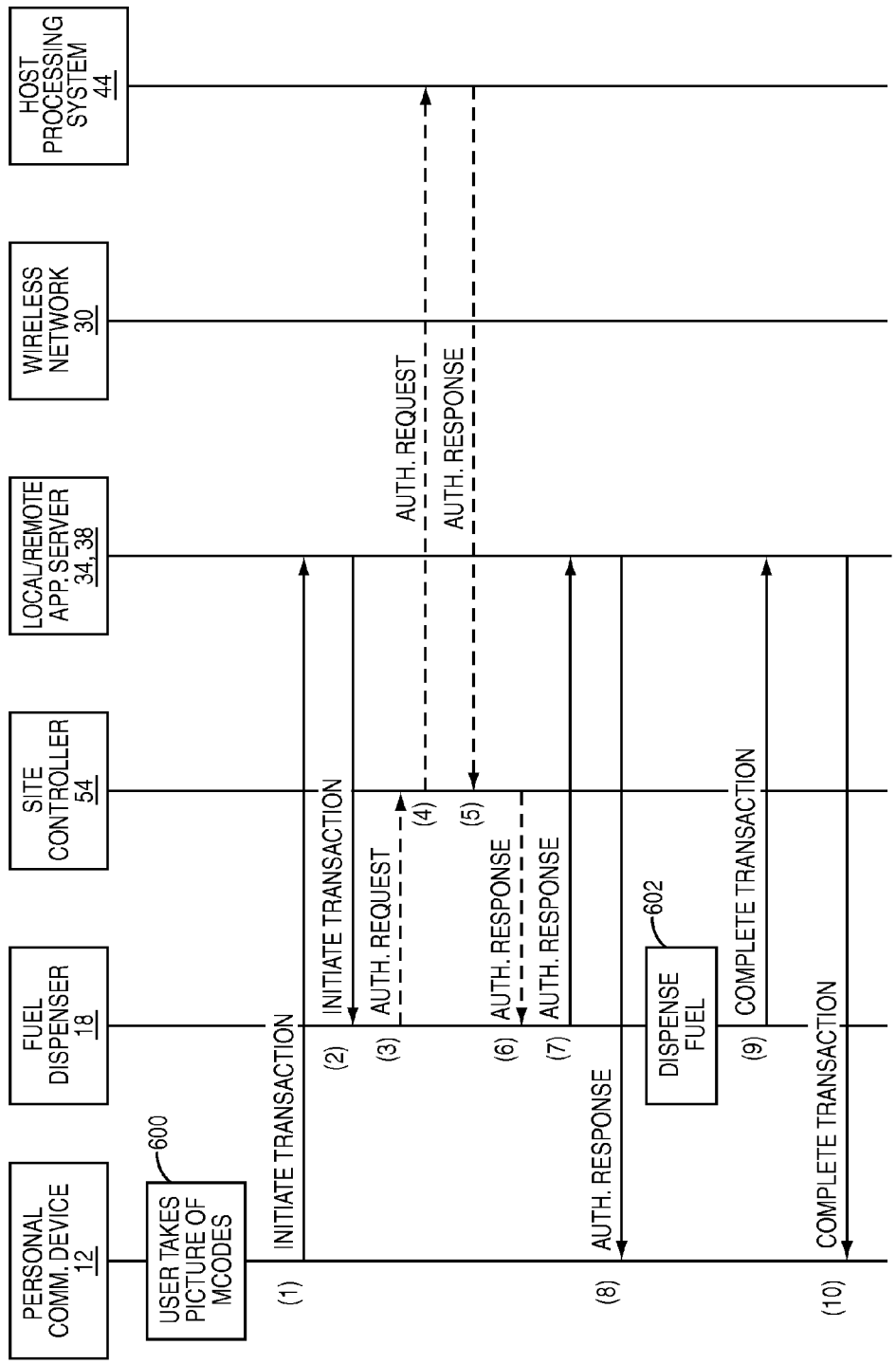
FIG. 7 illustrates an exemplary flow diagram for transaction processing where a personal communication device initiates transaction processing within a retail fueling environment via communication with a local or remote server, with the server further communicating with a fuel dispenser, according to an embodiment of the subject matter described herein.

As can be seen from FIG. 6, transaction processing begins with communications between the personal communication device 12 and the fuel dispenser 18. Alternatively, FIG. 7 illustrates transaction initiation and processing via communication between the personal communication device 12 and a server, such as the local application server 34 or the remote application server 38. The server then communicates with the fuel dispenser 18 for transaction processing.

FIG. 7 illustrates an exemplary flow diagram for transaction processing where the personal communication device 12 initiates a transaction within the retail fueling environment 10 via communication with a server, such as the local application server 34 or the remote application server 38, with the server further communicating with the fuel dispenser 18. As described above in association with FIG. 6, the user may initiate the transaction by taking a picture of a MCode 28 which is associated with the fuel dispenser 18 and/or the retail fueling environment 10 using a camera on the personal communication device 12 (block 600). In response to identifying the fuel dispenser 18 and/or the retail fueling environment 10, the personal communication device 12 initiates a transaction by communicating with the local application server 34 or the remote application server 38 (line 1). The communication protocol used to communicate between the personal communication device 12 and the selected server may be based upon available protocols and proximity of the devices. For example, if a Bluetooth connection is available between the personal communication device 12 and the local application server 34, then Bluetooth communication may be used between the two devices. Alternatively, wireless communication via the wireless network 30 may be used between the personal communication device 12 and either the local application server 34 or the remote application server 38.

The selected application server (e.g., the local application server 34 or the remote application server 38) will issue an initiate transaction message to the fuel dispenser 18 in response to receipt of the initiate transaction message from the personal communication device 12 (line 2). As described above in association with FIG. 6, an authorization request sequence may be initiated by the fuel dispenser 18 in response to receipt of the initiate transaction message (lines 3-6), depending upon the programming of the fuel dispenser 18. The fuel dispenser 18 will issue an authorization response to the selected application server (line 7) and the server will issue an authorization response to the personal communication device 12 (line 8) in response to receipt of the authorization response from the fuel dispenser 18.

After dispensing fuel (block 602), the fuel dispenser 18 issues a complete transaction message to the selected server (line 9) and in response the server issues a complete transaction message to the personal communication device 12 (line 10). As described above in association with FIG. 6, user selections and user information may be communicated between the personal communication device 12 and any other modules in the system at any point during the transaction. For example, user selections may be communicated between the personal communication device 12 and the selected server, and that server may communicate those selections to the fuel dispenser 18 or another module within the system and may further respond with user information to the personal communication device 12 at any point during the transaction.

Figure 8:
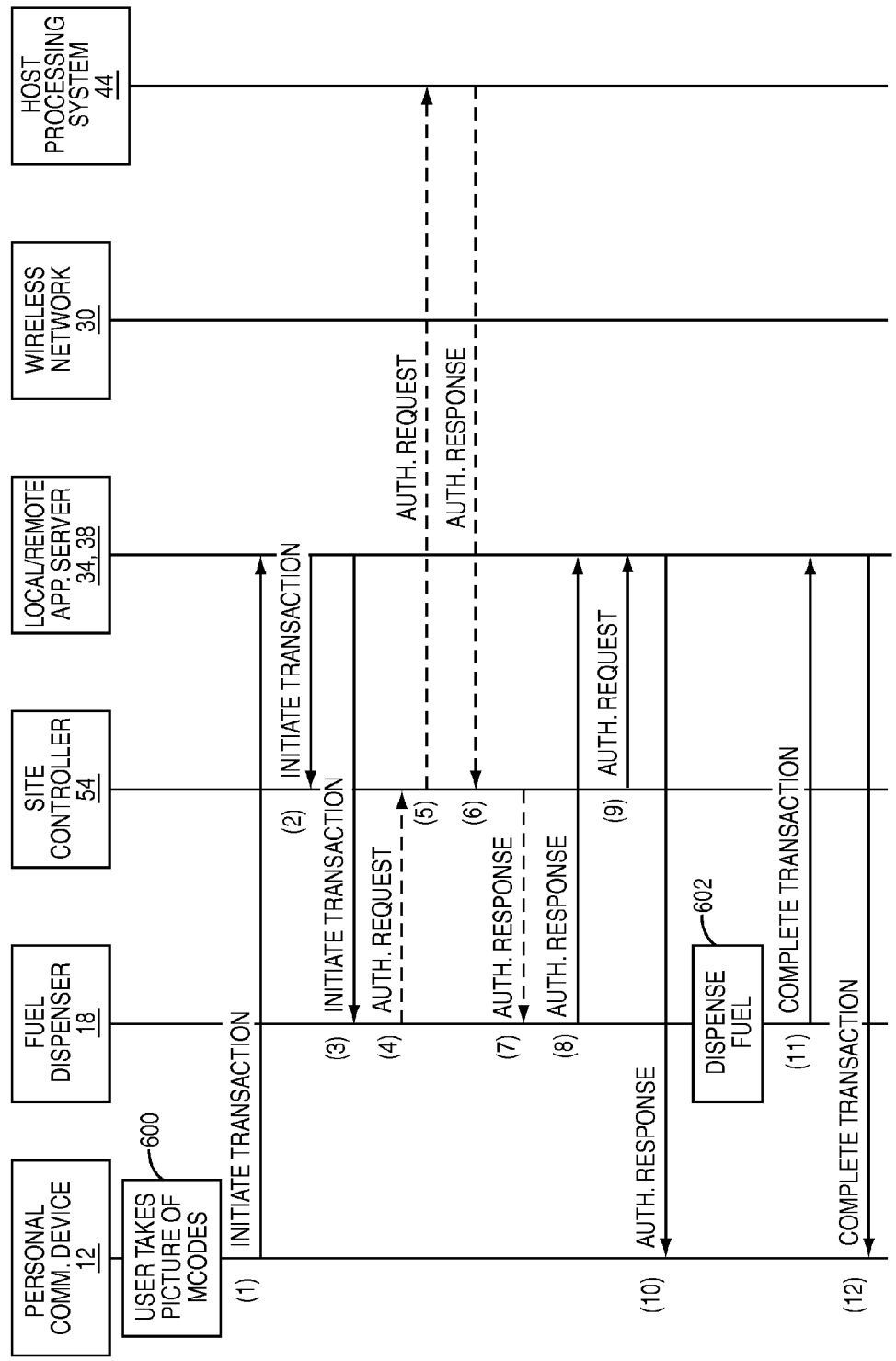
FIG. 8 illustrates an exemplary flow diagram for transaction processing where a personal communication device initiates transaction processing within a retail fueling environment via communication with a local or remote server, with the server further communicating with a fuel dispenser and a site controller to facilitate transaction processing, according to an embodiment of the subject matter described herein.

As can be seen from FIG. 7, transaction processing begins via communication between the personal communication device 12 and a server, such as the local application server 34 or the remote application server 38, and the server then communicates with the fuel dispenser 18 for transaction processing. FIG. 8 illustrates transaction processing wherein the personal communication device 12 initiates communication with a server, such as the local application server 34 or the remote application server 38, and the server then communicates with the fuel dispenser 18 and the site controller 54 for transaction processing.

FIG. 8 illustrates an exemplary flow diagram for transaction processing where the personal communication device 12 initiates transaction processing within the retail fueling environment 10 via communication with a server, such as the local application server 34 or the remote application server 38, with the server further communicating with the fuel dispenser 18 and the site controller 54 to facilitate transaction processing. As described above in association with other embodiments, the user may initiate a transaction by taking a picture of a MCode 28 that is associated with the fuel dispenser 18 to identify the fuel dispenser 18 and/or the retail fueling environment 10 (step 600). In this embodiment, the personal communication device 12 initiates a transaction by sending an initiate transaction message to either the local application server 34 or the remote application server 38 (line 1). The selected server (e.g., the local application server 34 or the remote application server 38) forwards an initiate transaction message to the site controller 54 and the fuel dispenser 18 (lines 2 and 3, respectively). As such, the site controller 54 may perform transaction processing interactions. An authorization request and response sequence (lines 4-7) as described above in association with other embodiments may be initiated by the fuel dispenser 18, depending upon the programming of the fuel dispenser 18. Alternatively, the site controller 54 may initiate an authorization request and response sequence (lines 5 and 6, respectively) and may issue an authorization response (line 7) to the fuel dispenser 18. The fuel dispenser 18 and the site controller 54 issue authorization responses (lines 8 and 9, respectively) to the selected server and the selected server issues an authorization response to the personal communication device 12 (line 10) in response to the initiate transaction messaging sequence described above (line 1).

After fuel dispensing is complete (block 602), the fuel dispenser 18 issues a complete transaction message (line 11) to the selected server and the selected server forwards the complete transaction message to the personal communication device 12 (line 12). As with other embodiments described above, user selections and user information may be communicated between the personal communication device 12 and any other modules at any point during the transaction processing without departure from the scope of the subject matter described herein.

Figure 9:
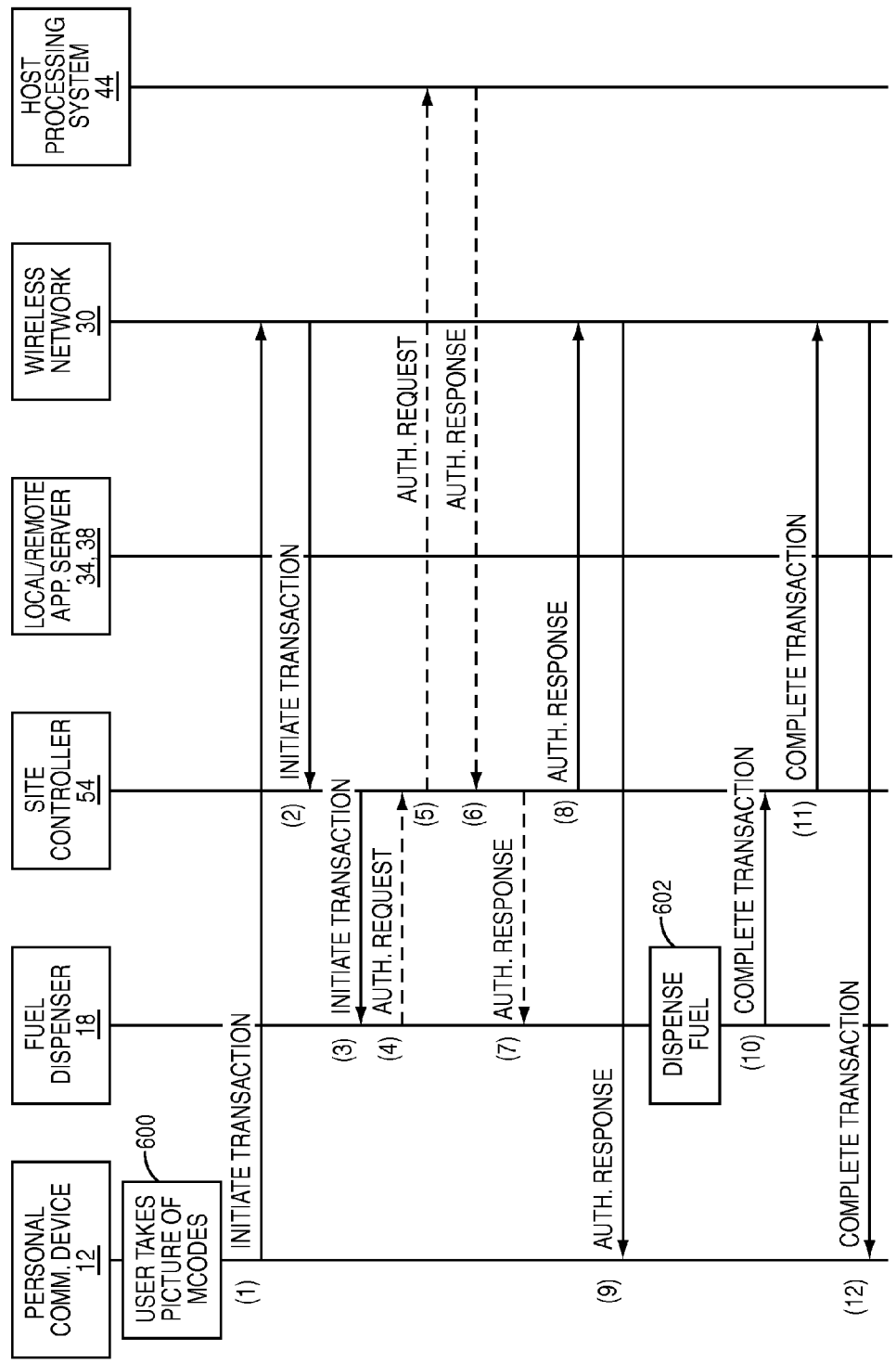
FIG. 9 illustrates an exemplary flow diagram for transaction processing where a personal communication device initiates transaction processing within a retail fueling environment via communication with a network to a site controller to facilitate transaction processing according to an embodiment of the subject matter described herein.

As can be seen from FIG. 8, transaction processing begins with the personal communication device 12 initiating communication with a server, such as the local application server 34 or the remote application server 38, and the server then communicates with the fuel dispenser 18 and the site controller 54 for transaction processing. FIG. 9 illustrates transaction processing wherein the personal communication device 12 initiates communication via a wireless network, such as the wireless network 30, to the site controller 54 to facilitate transaction processing.

FIG. 9 illustrates an exemplary flow diagram for transaction processing where the personal communication device 12 initiates transaction processing within the retail fueling environment 10 via communication with a wireless network, such as the wireless network 30, to the site controller 54 to facilitate transaction processing. The user may initiate a transaction by taking a picture of a MCode 28 that is associated with the fuel dispenser 18 to identify the fuel dispenser 18 and/or the retail fueling environment 10 (block 600) as described above. The personal communication device 12 issues an initiate transaction message via the wireless network 30 (line 1). In this embodiment, the wireless network 30 forwards the initiate transaction message to the site controller 54 (line 2). The site controller 54 forwards the initiate transaction message to the fuel dispenser 18 (line 3).

As described above, depending upon the programming of the fuel dispenser 18, an authorization request and response sequence (lines 4-7) may be initiated by the fuel dispenser 18. Alternatively, the site controller 54 may initiate an authorization request and response sequence (lines 5 and 6, respectively) and may issue an authorization response (line 7) to the fuel dispenser 18. The site controller 54 issues an authorization response message (line 8) via the wireless network 30 (line 8). The wireless network 30 forwards the authorization response message to the personal communication device 12 (line 9).

After fuel is dispensed (block 602), the fuel dispenser 18 issues a complete transaction message to the site controller 54 (line 10). In response, the site controller 54 forwards the complete transaction message via the wireless network 30 (line 11). The wireless network 30 forwards the complete transaction message to the personal communication device 12 (line 12) and transaction processing is complete. As with any of the embodiments described above, user selections and user information may be communicated between the personal communication device 12 and any other module at any time during transaction processing without departure from the scope of the subject matter described herein.

Figure 10:
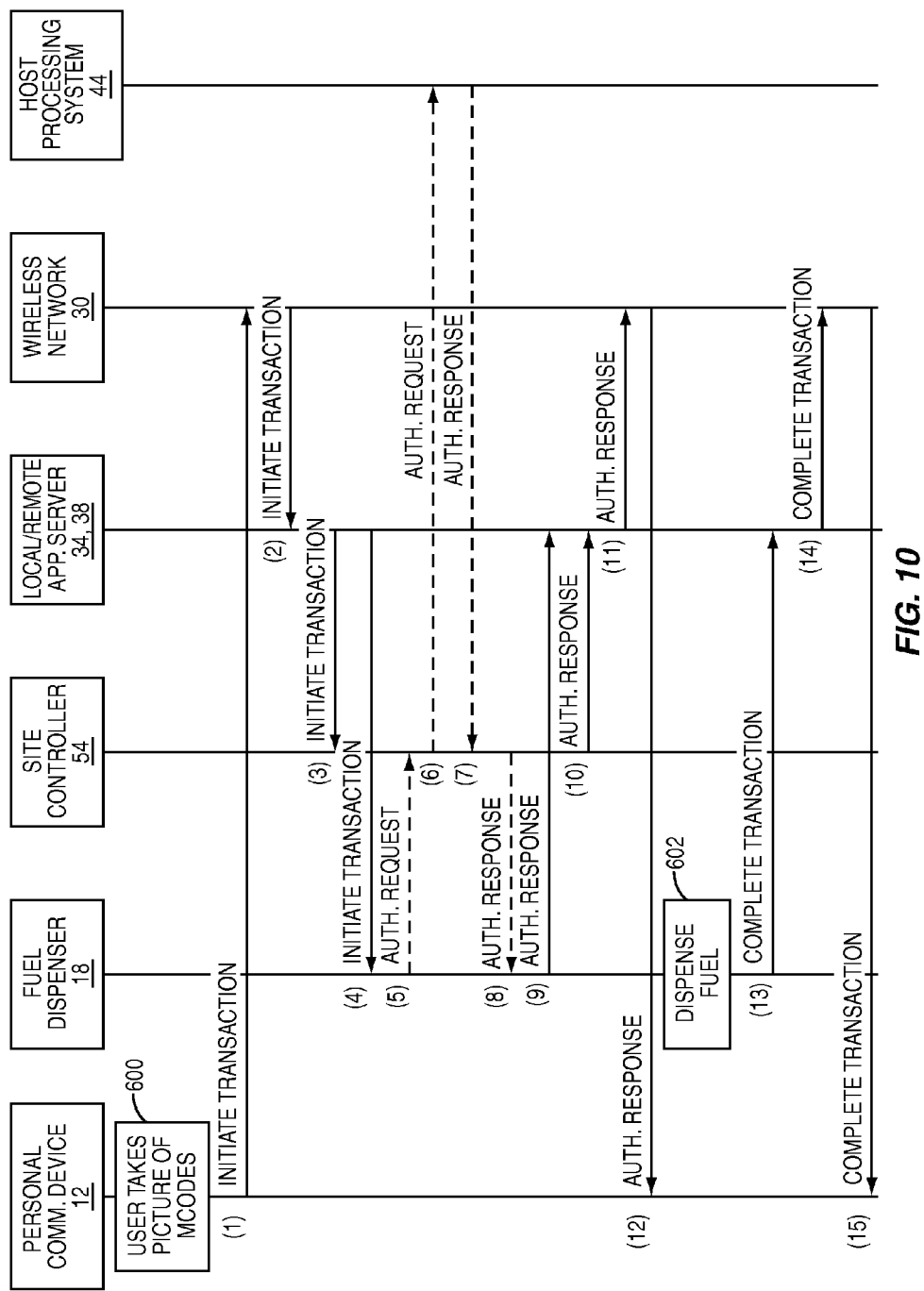
FIG. 10 illustrates an exemplary flow diagram for transaction processing where a personal communication device initiates transaction processing within a retail fueling environment via communication with a network to a local or remote server to facilitate transaction processing according to an embodiment of the subject matter described herein.

As can be seen from FIG. 9, transaction processing begins with the personal communication device 12 initiating communication via a wireless network, such as the wireless network 30, to the site controller 54 to facilitate transaction processing. FIG. 10 illustrates transaction processing wherein the personal communication device 12 initiates communication via a wireless network, such as the wireless network 30, to a server, such as the local application server 34 or the remote application server 38, to facilitate transaction processing FIG. 10 illustrates an exemplary flow diagram for transaction processing where the personal communication device 12 initiates transaction processing within the retail fueling environment 10 via communication with a wireless network, such as the wireless network 30, to a server, such as the local application server 34 or the remote application server 38, to facilitate transaction processing. As with the other embodiments described above, the user may initiate a transaction in a variety of ways, such as by taking a picture of the MCode 28 that is associated with the fuel dispenser 18 and/or the retail fueling environment 10 (block 600). The personal communication device 12 initiates the transaction by sending an initiate transaction message via the wireless network 30 (line 1). The wireless network 30 forwards the initiate transaction message to a selected server, such as the local application server 34 or the remote application server 38 (line 2). The selected server then forwards the initiate transaction message to the site controller 54 and the fuel dispenser 18 (lines 3 and 4, respectively).

As described above in association with other embodiments, the fuel dispenser 18 may initiate an authorization request and response sequence (lines 5-8) depending upon the programming of the fuel dispenser 18. Alternatively, the site controller 54 may initiate an authorization request and response sequence (lines 6 and 7, respectively) and may issue an authorization response (line 8) to the fuel dispenser 18. The fuel dispenser 18 and the site controller 54 issue authorization response messages to the selected server (lines 9 and 10, respectively). In response, the selected server forwards the authorization response via the wireless network 30 (line 11). The wireless network 30 forwards the authorization response message to the personal communication device 12 (line 12) and fuel is dispensed (block 602).

After the fuel is dispensed, the fuel dispenser 18 issues a complete transaction message to the selected server (line 13) and the selected server forwards the complete transaction message via the wireless network 30 (line 14). The wireless network 30 forwards the complete transaction message to the personal communication device 12 (line 15) and the transaction is completed.

As described above in association with other embodiments, user selections and user information may be communicated between the personal communication device 12 and any of the other modules at any point during the course of the transaction. Furthermore, it should be noted that FIGS. 6-10 illustrate certain embodiments of communication processes that may be initiated by a device, such as the personal communication device 12, to perform transaction authorization processing within the retail fueling environment 10. Many other processes and embodiments are possible and all are considered within the scope of the subject matter described herein.

Exemplary Fuel Dispenser Process for Application Specific User Interface Download and for Transaction Processing Within the previous figures, several transaction processing sequences were described. The following FIG. 11 describes an exemplary process that may be executed on the fuel dispenser 18 to facilitate download of an application specific user interface, such as the CTA 32, to the personal communication device 12, and for transaction processing within the retail fueling environment 10.

Figure 11:
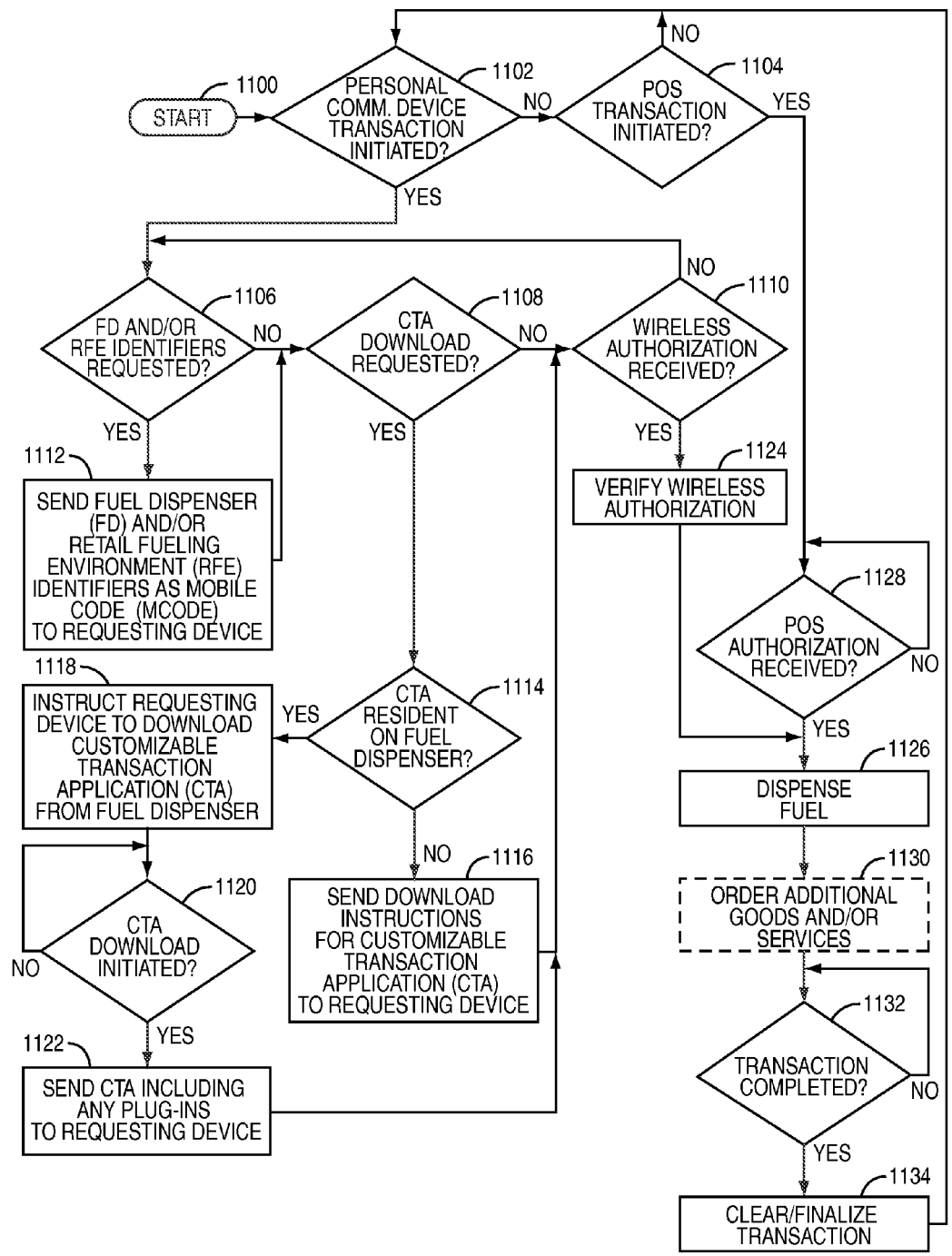
FIG. 11 illustrates an exemplary process that may be executed on a fuel dispenser for transaction processing according to an embodiment of the subject matter described herein.

FIG. 11 illustrates an exemplary process that may be executed on a fuel dispenser, such as the fuel dispenser 18, for transaction processing. The process begins (step 1100) and determines whether a personal communication device transaction has been initiated by the personal communication device 12 (decision point 1102). When a determination is made that a personal communication device transaction has not been initiated, the process determines whether a POS transaction has been initiated by a POS device, such as the POS devices 52 (decision point 1104). When a determination has been made that a POS transaction has not been initiated, the process iteratively determines whether a personal communication device transaction has been initiated and whether a POS transaction has been initiated.

When a determination has been made that a personal communication device transaction has been initiated (decision point 1102), the process determines whether fuel dispenser and/or retail fueling environment identifiers have been requested by the personal communication device 12 (decision point 1106). When a determination is made that fuel dispenser and/or retail fueling environment identifiers have not been requested, the process determines whether a CTA download request has been received from the personal communication device 12 (decision point 1108). When a determination has been made that a CTA 32 download request has not been received, the process determines whether a wireless authorization has been received (decision point 1110). The process iteratively determines whether fuel dispenser and/or retail fueling environment identifiers have been requested, whether a CTA download has been requested, and whether a wireless authorization has been received.

When a determination has been made that fuel dispenser and/or retail fueling environment identifiers have been requested by the personal communication device 12, the process sends fuel dispenser and/or retail fueling environment identifiers to the requesting device (block 1112). The fuel dispenser 18 and/or retail fueling environment 10 identifiers may be formatted and transmitted in any suitable format, including a MCode 28 storage and transmission format.

When a determination is made that a CTA download request has been received (decision point 1108), the process determines whether the requested CTA 32 is resident on the fuel dispenser 18 (decision point 1114). When a determination is made that the CTA 32 is not resident on the fuel dispenser 18, the process sends download instructions for the CTA 32 to the requesting device (block 1116). When a determination is made that the CTA 32 is resident on the fuel dispenser 18, the process sends an instruction to the personal communication device 12 to download the CTA 32 from the fuel dispenser 18 (step 1118). The process then waits for the CTA download to be initiated by the personal communication device 12 (decision point 1120). When the CTA download has been initiated, the process sends the CTA 32 including any plug-ins to the requesting device (step 1122).

When the process determines that a wireless authorization has been received (decision point 1110), the process verifies the wireless authorization (block 1 124). As described above in association with FIGS. 6-10, the verification of the wireless authorization may include initiating an authorization request and response sequence between the fuel dispenser 18 and the site controller 54 to authorize the transaction and may include communication with the host processing system 44 or other modules to authorize the transaction. Additionally, pre-paid minutes associated with the personal communication device 12 may be used to authorize the wireless transaction, which may include communication via the wireless network 30 for transaction authorization processing.

When the wireless authorization has been verified, the process allows fuel to be dispensed (block 1126). Likewise, when the process determines that a POS transaction has been initiated (decision point 1104), the process waits for a POS authorization to be received (decision point 1128) and authorizes fuel to be dispensed (block 1126) in response to receipt of the POS authorization.

At any point during the transaction process, additional goods and/or services may be ordered via the personal communication device 12 (block 1130) and the process waits for the transaction to be completed (decision point 1132). When a determination is made that the transaction is completed, the process clears and finalizes the transaction (step 1134) and the process returns to await a new personal communication device or POS transaction.

Exemplary Server Application Specific User Interface Download Process

Figure 12:
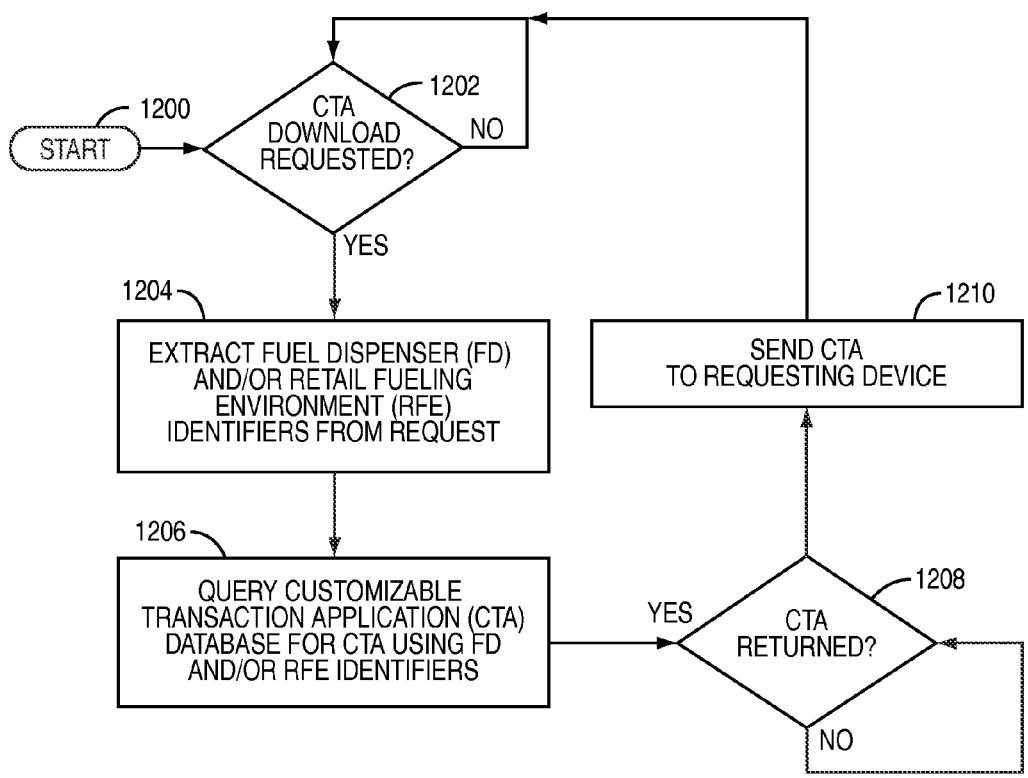
FIG. 12 illustrates an exemplary process that may be executed on a local or remote server to accommodate CTA download to a personal communication device according to an embodiment of the subject matter described herein.

The following FIG. 12 provides an exemplary process that may be executed on a server, such as the local application server 34 or the remote application server 38, to accommodate download of an application specific user interface, such as the CTA 32, to the personal communication device 12.

FIG. 12 illustrates an exemplary process that may be executed on a server, such as the local application server 34 or the remote application server 38, to accommodate CTA download to the personal communication device 12. The process beings (step 1200) and waits for a CTA download request (decision point 1202). When a determination is made that a CTA download request has been received, the process extracts fuel dispenser and/or retail fueling environment identifiers from the request (step 1204). The process then queries a CTA database, such as the local application database 36 or the remote application database 40, using the fuel dispenser 18 and/or retail fueling environment 10 identifiers (step 1206) for an appropriate CTA, such as the CTA 32, that supports transaction processing via the fuel dispenser 18 and/or the retail fueling environment 10. The process waits for the CTA 32 to be returned from the CTA database (decision point 1208) and sends the CTA 32 to the requesting device (step 1210) when the CTA 32 has been returned. The process then returns to await a new CTA download request.

Exemplary Site Controller Transaction Processing and Fraud Prevention Process

Figure 13:
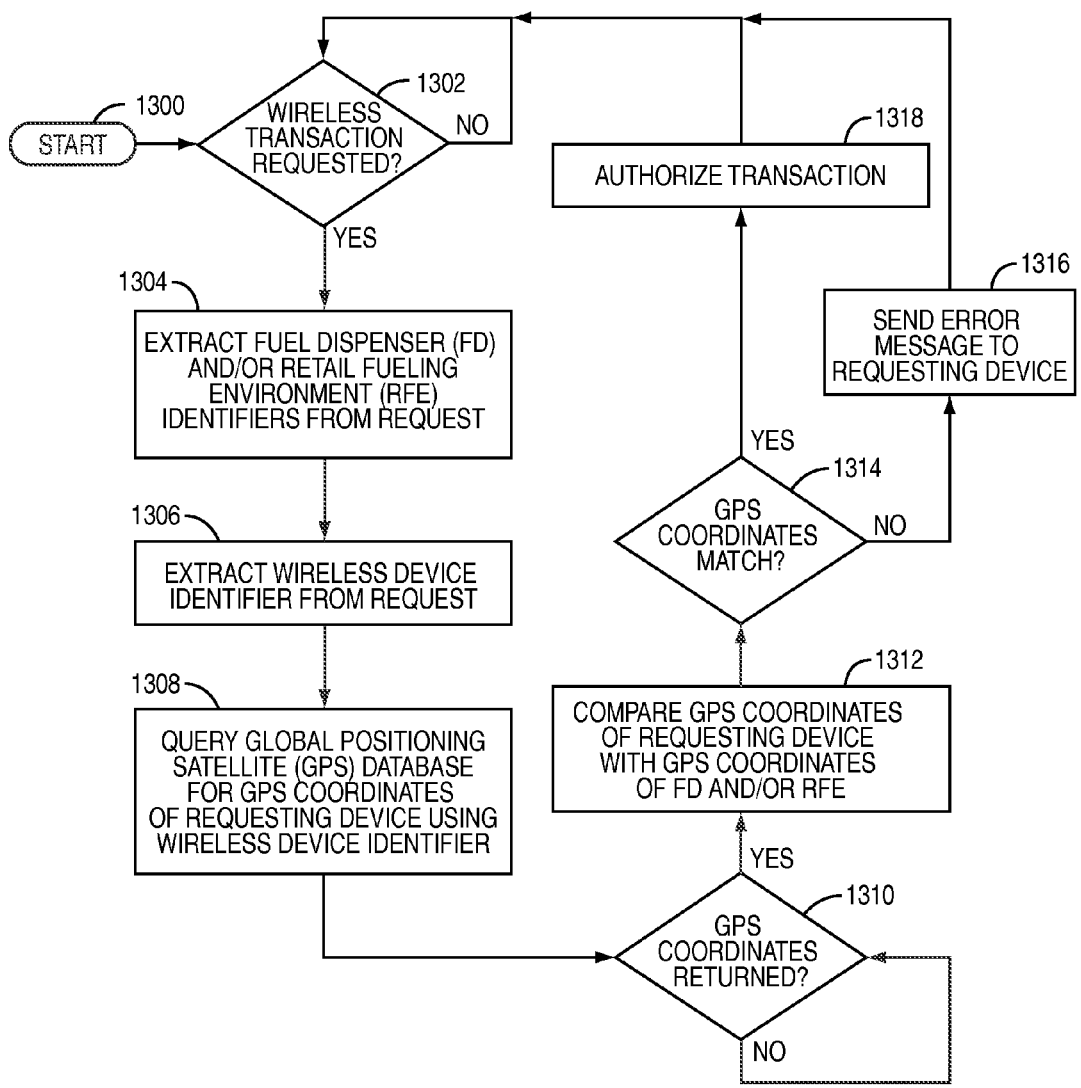
FIG. 13 illustrates an exemplary process that may be executed on a site controller to facilitate wireless transaction processing including fraud prevention according to an embodiment of the subject matter described herein.

Fraud may also be prevented based upon the present invention by verifying that the customer is physically located at the fuel dispenser 18 and/or retail fueling environment 10 associated with a requested transaction. Because a perpetrator of fraud may attempt to modify the code 28 to identify a fuel dispenser that is physically located at a different fueling site, the site controller or fuel dispenser associated with the transaction may verify that the customer is physically located at the fuel dispenser 18 associated with the transaction by use of a location mechanism, such as global positioning system (GPS). FIG. 13 illustrates an exemplary process that may be executed on a site controller, such as the site controller 54, for fraud prevention. A similar process may be executed on the fuel dispenser 18 without departure from the scope of the subject matter described herein.

FIG. 13 illustrates an exemplary process that may be executed on a site controller, such as the site controller 54, to facilitate wireless transaction processing including fraud prevention. The process begins (step 1300) and waits for a wireless transaction request (decision point 1302) initiated by the personal communication device 12.

When a determination is made that a wireless transaction has been requested by the personal communication device 12, the process extracts fuel dispenser and/or retail fueling environment identifiers from the request (step 1304). The process also extracts a wireless device identifier from the request (step 1306) and queries a GPS database, such as the GPS server 62, for GPS coordinates of the requesting device using the wireless device identifier (step 1308).

The process waits for GPS coordinates for the requesting wireless device to be returned (decision point 1310). When the GPS coordinates for the requesting wireless device have been returned, the process compares the GPS coordinates of the requesting wireless device with GPS coordinates of the fuel dispenser 18 and/or retail fueling environment 10 (step 1312). The process makes a determination whether the GPS coordinates match with sufficient resolution to verify that the personal communication device 12 is actually located proximate to the fuel dispenser 18 at which the transaction has been initiated (decision point 1314).

When a determination is made that the GPS coordinates do not match, the process sends an error message to the requesting wireless device and does not authorize the transaction (step 1316). When a determination is made that the GPS coordinates do match with sufficient resolution to verify that the requesting wireless device is proximate to the fuel dispenser 18 at which the transaction is being initiated, the process authorizes the transaction (step 1318) and returns to await a new wireless transaction request. In this way, fraud may be prevented within the retail fueling environment 10 in conjunction with wireless transaction requests from a device, such as the personal communication device 12.

Exemplary Transaction Automation Process Utilizing Defined User Preferences

Figure 14:
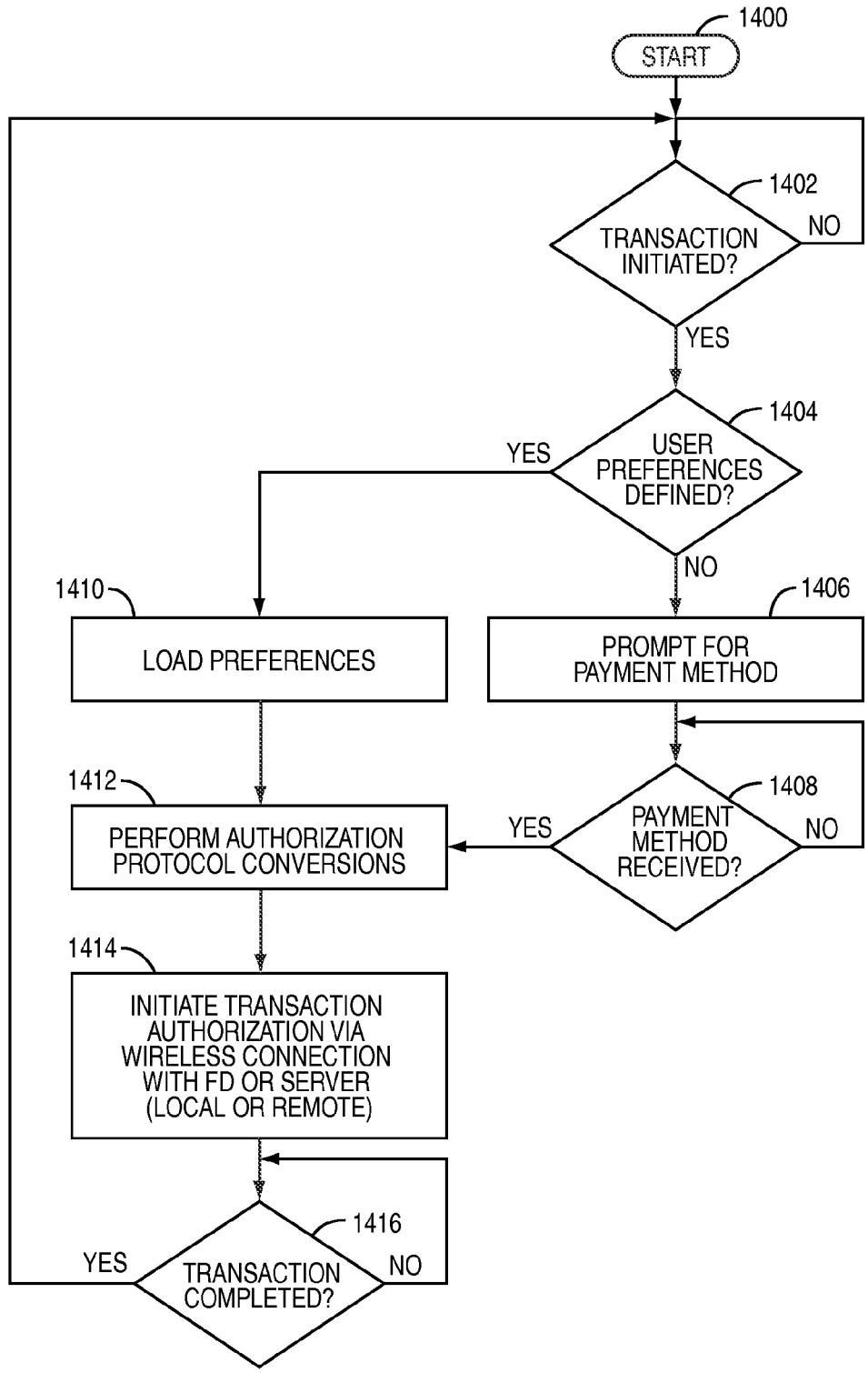
FIG. 14 illustrates an exemplary process by which user preferences may be utilized during a transaction initiated from a personal communication device according to an embodiment of the subject matter described herein.

As described above, user preferences may be defined to automate and expedite transaction processing by minimizing the steps required of the customer to initiate and complete a transaction within the retail fueling environment 10. FIG. 14 below illustrates an exemplary process by which user preferences may be used for transaction processing within the retail fueling environment 10. While FIG. 14 illustrates automation of transaction payment processing, many other preference automations are possible, such as, for example, fuel grade selection and receipt selection.

FIG. 14 illustrates an exemplary process by which user preferences may be utilized during a transaction initiated from the personal communication device 12. The process begins (step 1400) and waits for a transaction to be initiated (decision point 1402). When a transaction is initiated, the process determines whether any user preferences have been defined (decision point 1404).

When a determination is made that no user preferences have been defined, the process prompts the user for a payment method (step 1406) and waits for the payment method to be received (decision point 1408). The payment method may include pre-paid minutes associated with the personal communication device 12, credit/debit, or other account information. Alternatively, when user preferences have been defined, the process loads those preferences (step 1410).

When the preferences have been loaded or when the payment method has been received, the process performs authorization protocol conversions to facilitate automated transaction processing within the retail fueling environment 10 (step 1412). Authorization protocol conversion may be utilized, for example, to accommodate varying authorization protocol sequences used in different retail fueling environments. Furthermore, this authorization protocol conversion may be performed within a plug-in associated with the CTA 32. Accordingly, the CTA 32 may be used with a variety of plug-ins to facilitate automated wireless transaction processing within a variety of retail fueling environments using user preferences previously defined by the user.

When any authorization protocol conversions are completed, the process initiates a transaction authorization via a wireless connection, such as a Bluetooth or cellular connection, with the fuel dispenser 18 or a selected server, such as the local application server 34 or the remote application server 38 (step 1414). The process then waits for the transaction to be completed (decision point 1416) and, when completed, returns to await a new transaction initiation.

Figure 15:
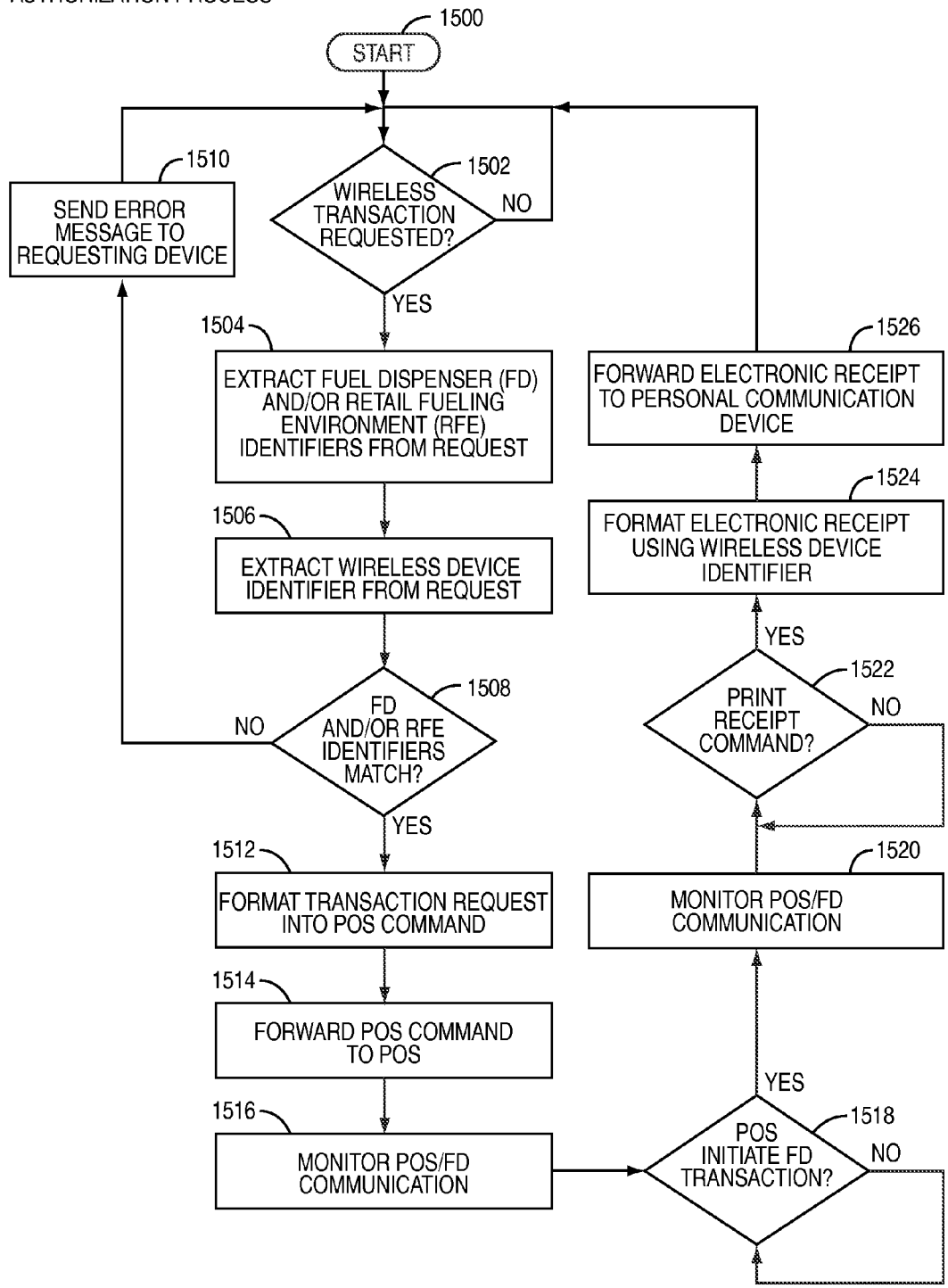
FIG. 15 illustrates an exemplary process by which a local server may be deployed within a retail fueling environment to act as a liaison between a customer's personal communication device and a point of sale (POS) device within the retail fueling environment according to an embodiment of the subject matter described herein.

Application Specific User Interface Interaction with a Server for Legacy System Upgrade Legacy retail fueling environments may also be upgraded to allow a customer to utilize an application specific user interface, such as the CTA 32, on the customer's personal communication device 12, with the deployment of a single server, such as the local application server 34. FIG. 15 illustrates an exemplary process that may be executed on the local application server 34 for interaction with the personal communication device 12 and for generation of legacy commands to and from point of sale devices, such as the POS devices 52, and the fuel dispenser 18 for transaction processing.

FIG. 15 illustrates an exemplary process by which the local application server 34 may be deployed within the retail fueling environment 10 to act as a liaison between the customer's personal communication device 12 and one of the POS devices 52 within the retail fueling environment 10. During a provisioning process, the local application server 34 may be configured with identifiers for the fuel dispensers 18 and/or the retail fueling environment 10 within which is it installed.

The process begins (step 1500) and waits for a wireless transaction request (decision point 1502) initiated by the personal communication device 12. A transaction initiation request from the personal communication device 12 may be received either via the wireless network 30 via the cellular antenna 24, or Bluetooth wireless connectivity via the Bluetooth antenna 26.

When a determination is made that a wireless transaction has been requested by the personal communication device 12, the process extracts fuel dispenser and/or retail fueling environment identifiers from the request (step 1504). The process also extracts a wireless device identifier from the request (step 1506) and determines whether the extracted identifiers match at least one of the fuel dispensers 18 and/or the retail fueling environment 10 within which the local application server 34 is installed (step 1508).

When a determination is made that the extracted identifiers do not match at least one of the fuel dispensers 18 and/or the retail fueling environment 10 within which the local application server 34 is installed, the process sends an error message to the requesting device (step 1510). In this way, fraud may be prevented within a legacy system by verifying that the extracted identifiers match identifiers provisioned in associated with the local application server 34.

When a determination is made that the extracted identifiers match at least one of the fuel dispensers 18 and/or the retail fueling environment 10 within which the local application server 34 is installed, the process formats the received transaction request into a legacy POS command (step 1512), such as a card swipe format, and forwards the legacy command to one of the deployed POS devices 52 to initiate the transaction (step 1514). In response, the POS device 52 will then enable the identified fuel dispenser 18 to allow fuel delivery.

The local application server 34 then monitors communications between the POS device 52 and the fuel dispenser 18 (step 1516) to determine when the POS device 52 initiates the transaction (decision point 1518). When a determination is made that the POS device 52 has initiated the transaction, the process again monitors communications between the POS device 52 and the fuel dispenser 18 (step 1520) to determine when the POS device 52 issues a receipt print command (decision point 1522). When a determination is made that the POS device 52 has issued a receipt print command to the fuel dispenser 18, the process formats an electronic receipt using the extracted wireless device identifier (step 1524), forwards it to the personal communication device 12 via the cellular antenna 24 to the wireless network 30 or via the Bluetooth antenna 26 (step 1526), and returns to await a new transaction (decision point 1502).

Figure 16:
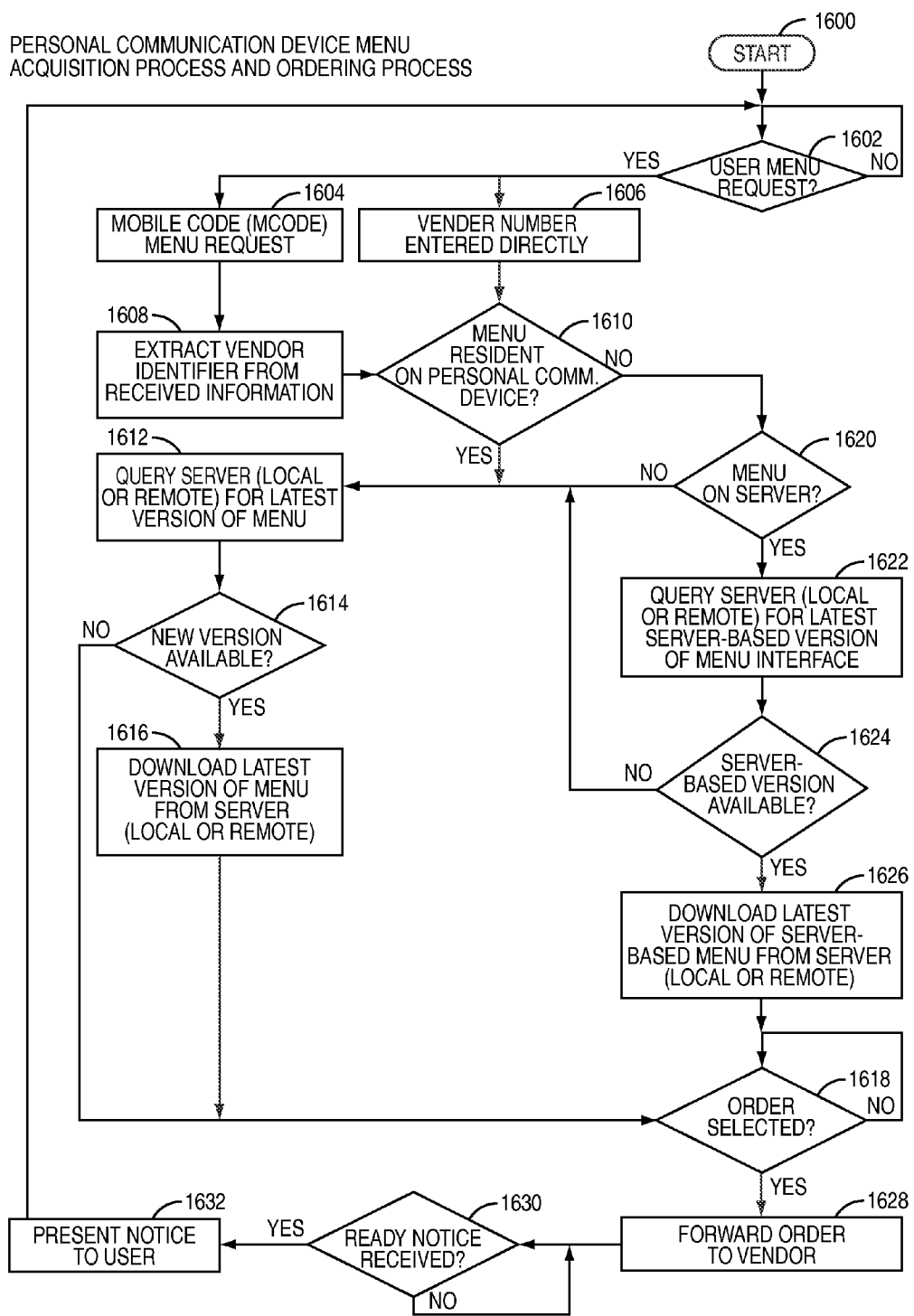
FIG. 16 illustrates an exemplary process by which a customer's personal communication device acquires a menu to allow the customer to place an order for other goods and services and receive a notification when the order is ready for pickup according to an embodiment of the subject matter described herein.

Exemplary Personal Communication Device Menu Acquisition and Ordering Process for Additional Goods and/or Services within a Retail Fueling Environment In addition to automating transaction processing for fuel within the retail fueling environment 10, the present invention provides the customer with the ability to download a menu of other goods and/or services that are available within the retail fueling environment 10 and to place an order for additional goods and/or services from the downloaded menu. The customer may further be notified when the order has been fulfilled and is ready for pickup. FIG. 16 illustrates an exemplary process that may be executed on the customer's personal communication device 12 to download a menu of additional goods and/or services, place an order using the menu, and receive a notification that the order has been fulfilled.

FIG. 16 illustrates an exemplary process by which a customer's personal communication device 12 acquires a CTA-driven menu to allow the customer to place an order for other goods and/or services and receive a notification when the order is ready for pickup. The process begins (step 1600) and waits for a user menu request (decision point 1602) initiated by the personal communication device 12.

When a user menu request has been received, the process determines which type of menu request has been received. For example, the personal communication device 12 may take a picture of a MCode 28 and initiate a menu request by identifying a vendor associated with the MCode 28. The vendor may include the quick serve restaurant 50 or the convenience store 48 within the retail fueling environment 10, or may include a remote vendor of goods and/or services. The MCode 28 used for instant ordering may be located within the retail fueling environment 10 or elsewhere, such as on a bulletin board along the highway or within an airport terminal. As another exemplary alternative, the user of the personal communication device 12 may directly enter a number that is found on the face of the fuel dispenser 18 or elsewhere that identifies the vendor at which the user is located. Accordingly, the process determines whether a MCode transaction has been initiated (step 1604) or whether a vendor number has been entered directly (step 1606).

When a MCode menu request has been initiated, the process extracts the vendor identifier from the received information (step 1608). For example, an extracted vendor identifier may identify the quick server restaurant 50 located within the retail fueling environment 10. When the vendor identifier has been extracted or when the vendor identifier has been entered directly by the user, the process determines whether a menu associated with the vendor is resident on the personal communication device 12 (decision point 1610).

When a determination is made that a CTA-driven menu associated with the vendor is resident on the personal communication device 12, the process queries a server, such as the local application server 34 or the remote application server 38, for the latest version of the CTA-driven menu (step 1612). In response to the query, a determination is made as to whether a new version of the CTA-driven menu is available (decision point 1614). If a new version of the CTA-driven menu is available, the latest version of the CTA-driven menu is downloaded from a server, such as the local application server 34 or the remote application server 38 (step 1616). The process then waits for an order for goods and/or services to be initiated (decision point 1618).

When a determination is made that the CTA-driven menu is not resident on the personal communication device 12 (decision point 1610), a determination is made as to whether to execute the CTA-driven menu on a server, such as the local application server 34 or the remote application server 38 (decision point 1620). When a determination is made to execute the CTA-driven menu on a server, the process queries the server, such as the local application server 34 or the remote application server 38, for the latest server-based version of a CTA-driven menu interface that is executable on the personal communication device 12 (step 1622). In response to the query, the process determines whether a server-based version of the CTA-driven menu is available (decision point 1624). When either a server-based version of the CTA-driven menu is not available or when a determination is made not to execute the CTA-driven menu on a server, the process continues as described above to query for and download the latest version of the CTA-driven menu. When a server-based version of the CTA-driven menu is available, the process downloads the latest version of the server-based CTA-driven menu from a server, such as the local application server 34 or the remote application server 38 (step 1626).

The process then waits for a transaction to be initiated as described above (decision point 1618). When an order is selected, the process forwards the order along with payment indicia and information identifying the customer's personal communication device 12 to the vendor for fulfillment of the order (step 1628). The payment indicia may include credit/debit card information, pre-paid minutes associated with a wireless or other account, a 1-900 number type of service to charge payment to a home telephone, or any other form of payment indicia. The order may be forwarded either via the cellular antenna 24 to communicate using the wireless network 30 or via the Bluetooth antenna 26 to communicate using Bluetooth wireless connectivity with the vendor.

The process waits for a notice that the order is ready for pickup to be received from the vendor (decision point 1630). When a notice that the order is ready for pickup has been received from the vendor, the process presents the notification to the user on the personal communication device 12 (step 1632).

As such, the customer can place an order for goods and/or services using a CTA-driven menu-based application on his or her personal communication device 12 and can receive a notification on their personal communication device 12 from the vendor indicating that the order has been fulfilled. The vendor issues a notification to the customer via the wireless network 30 or via Bluetooth wireless connectivity indicating that the order is ready for pickup. The notification may be in the form of a text message, a ring tone such as the vendor's advertising jingle, or the vendor may directly call the customer by dialing a telephone number that is associated with the customer's personal communication device 12. The notification process may be automated to provide the vendor with a notification method based upon the initial order and the information identifying the customer's personal communication device 12 that was forwarded with the initial order.

Though not depicted in FIG. 16 for ease of illustration, as with any other embodiment described herein, information, such as language preference, may be used during the download process to select a CTA-driven menu that is represented in the customer's native language. The customer selects items from the CTA-driven menu and places an order using the CTA-driven menu on the customer's personal communication device 12. Preferences may be stored within the customer's personal communication device 12 to expedite future orders when the preferences adequately identify what the customer wishes to presently order (e.g., a hamburger, french fries, and a drink).

Exemplary Alternative Content Delivery Process

Figure 17:
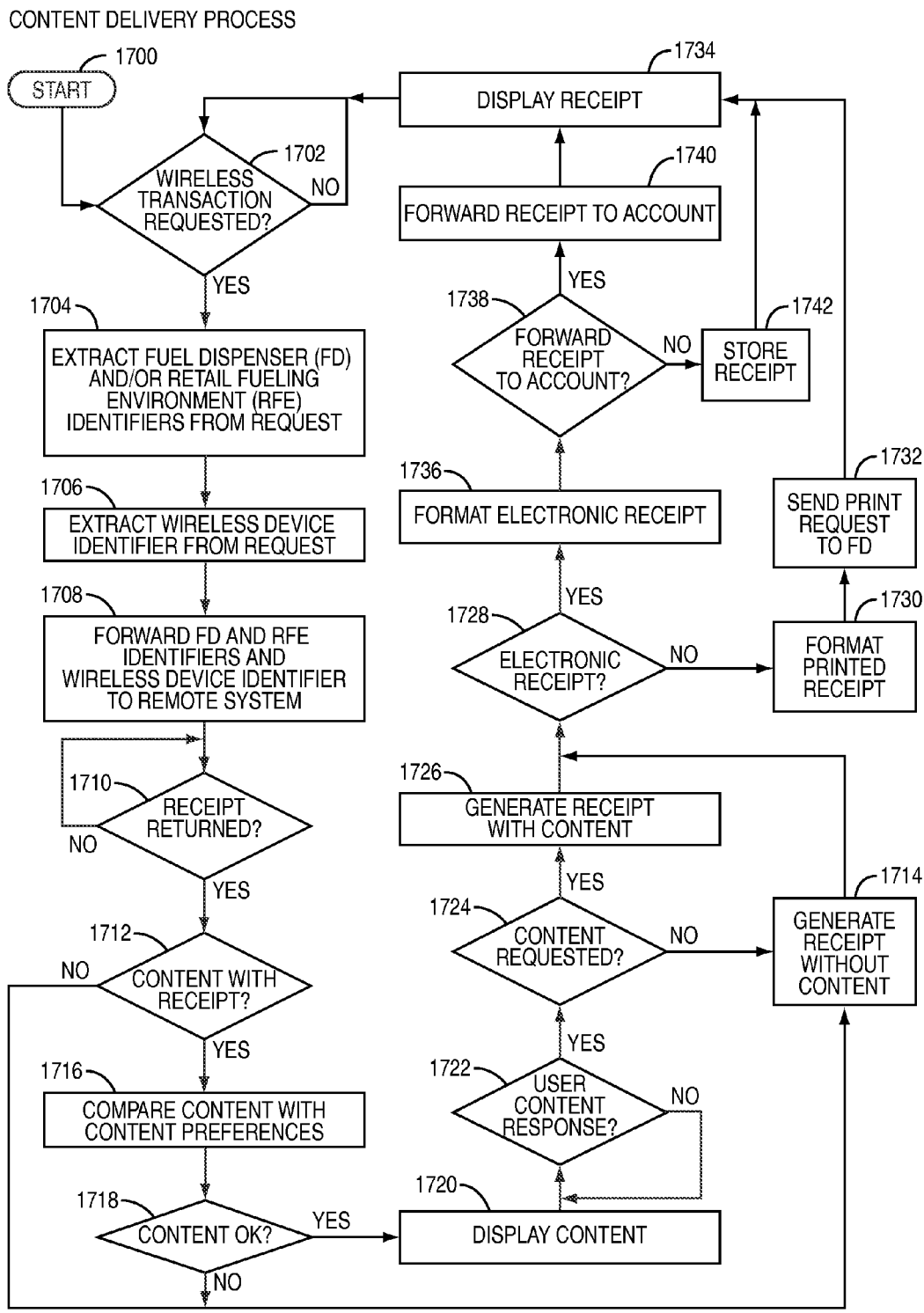
FIG. 17 illustrates an exemplary process by which alternative content, including receipts, advertising, promotions, loyalty programs, and contests, are delivered to a customer's personal communication device according to an embodiment of the subject matter described herein.

In addition to the purchase of additional goods and/or services, the present invention provides for the delivery of alternative content, such as electronic receipts, advertising, promotions, loyalty programs, and contest notifications, to the customer's personal communication device 12. FIG. 17 illustrates an exemplary process that may be used to deliver alternative content to the customer's personal communication device 12.

FIG. 17 illustrates an exemplary process by which alternative content, including electronic receipts, advertising, promotions, loyalty programs, and contest notifications, are delivered to the customer's personal communication device 12. The content delivered to the customer's personal communication device 12 may be dynamically chosen based upon the customer's age, income, or other relevant consideration. The process begins (step 1700) and waits for a wireless transaction request (decision point 1702) initiated by the personal communication device 12. As with other embodiments, the transaction initiation request from the personal communication device 12 may be received either via the wireless network 30 via the cellular antenna 24 or Bluetooth wireless connectivity via the Bluetooth antenna 26.

When a determination is made that a wireless transaction has been requested by the personal communication device 12, the process extracts fuel dispenser and/or retail fueling environment identifiers from the request (step 1704). The process also extracts a wireless device identifier from the request (step 1706) and forwards the fuel dispenser and/or the retail fueling environment identifiers along with the wireless device identifier to a remote system, such as the remote system 46 (step 1708). The remote system 46 examines the received identifiers and determines alternative content to provide to the customer with the receipt. The remote system 46 may select content for delivery along with a receipt for the transaction. This content may be selected based upon information that is known about the customer based upon the wireless device identifier and may be selected based upon availability of alternative content within the retail fueling environment 10. The process then waits for a receipt for the transaction to be returned (decision point 1710).

When a determination is made that a receipt has been returned, the process determines whether any additional content has been received with the receipt (decision point 1712). Additional content may include any form of content, such as advertising, promotions, loyalty programs, and contests, that may be of interest to the customer. When a determination is made that additional content has not been received with the receipt, the process generates a receipt without any associated content (step 1714). The receipt may be in the form of an electronic receipt that is stored on the personal communication device 12 for later download to an accounting or other program, or may be forwarded to an account accessible at a later time by the customer.

When a determination is made that additional content has been received with the receipt, the process compares the received content with content preferences that have been created by the customer (step 1716). The customer may define the type of content that is to be received by defining marketing preferences. A customer content profile may be created by the customer via the CTA 32 on the personal communication device 12 that includes the defined marketing preferences. In this way, the content that is delivered to the customer may be filtered by the CTA 32 based on the customer's age, income, or other considerations. Based upon the defined preferences, the process determines whether the content is consistent with the defined preferences (decision point 1718).

When the content is not consistent with the defined preferences, the process generates a receipt without any associated content (step 1714), as described above. When the content is consistent with the defined preferences, the content is displayed (step 1720) and the process waits for a user response (decision point 1722). When the customer provides a response, the process determines whether the response includes a request for the displayed content (decision point 1724). When the response does not include a request for the displayed content, the process generates a receipt without any associated content (step 1714), as described above.

When the response includes a request for the displayed content, the process generates a receipt with any associated content (step 1726). Once a receipt is generated that includes requested content, the customer may use the receipt to retrieve the content or may forward the receipt to another person by way of an account transfer of the receipt, as will be described in more detail below. By forwarding the receipt, a person may make a purchase and provide the subject matter of the purchase as a gift to another individual.

Once a receipt is generated (either of steps 1714 and 1726), the process determines whether the customer has requested an electronic receipt (decision point 1728). When a determination is made that the customer does not want an electronic receipt, the process formats a printed receipt (step 1730). The customer may instruct the fuel dispenser 18, via a key press either on the personal communication device 12 or on the fuel dispenser 18, to print a receipt including the offer or the customer may show the content displayed on the personal communication device 12 to the attendant of the retail fueling environment 10 to receive the offered item or discount represented by the content. When requested, the personal communication device 12 sends a print request to the fuel dispenser 18 (step 1732). The receipt may be sent to the fuel dispenser 18 via the cellular antenna 24 or the Bluetooth antenna 26, as described in association with other embodiments above. The receipt is also displayed on the personal communication device 12 (step 1734) and the process returns to await a new transaction (decision point 1702).

When a determination is made that the customer wants an electronic receipt (decision point 1728), the process formats an electronic receipt (step 1736) and makes a determination as to whether the customer wishes to forward the receipt to an account owned by the customer for later retrieval and accounting purposes or to an account owned by another person as a gift of the additional content (decision point 1738). A URL may be provided to the customer, which when selected, provides an interface with which to specify the form of receipt for the transaction, such as printed on the fuel dispenser 18 or electronic, and whether to deliver the receipt to the customer's personal communication device 12 or to an account for later processing.

The customer may choose to convey the receipt and/or the reward contained therein to another person via either the printed receipt or an electronic communication, such as an email or text-based communication, of the content to the other person. The other person may then retrieve the product from the designated URL by selecting a link within the electronic receipt or by scanning a MCode associated with the purchase on the printed receipt. Once an electronic receipt has been generated, the customer or other person may import the receipt into financial software, expense reports, or rebate forms.

Additionally, a printed receipt may be printed with conductive ink, such as radio frequency identification (RFID) ink, and the customer's personal communication device 12 may be used to scan the RFID ink to convert the receipt to electronic form. Alternatively, the content may include a uniform resource locator (URL) that returns a picture of the content, such as a picture of a free drink. The customer may respond by selecting the URL, which may present the customer with additional purchase options. For example, the customer may purchase a ring tone or sound recording. When a product such as a ring tone or sound recording is purchased, the customer receives a receipt for the transaction and may request either a printed or electronic format for the receipt. A unique URL may be created for each item of content delivered or purchased by the customer. The unique URL for the purchase may be destroyed after the product is retrieved.

When a determination is made that the customer wishes to forward the receipt to an account, the receipt is forwarded to the account (step 1740), the receipt is displayed (step 1734), and the process returns to await a new transaction (decision point 1702), as described above. When a determination is made that the customer does not wish to forward the receipt to an account, the receipt is stored on the personal communication device 12 (step 1742), the receipt is displayed (step 1734), and the process returns to await a new transaction (decision point 1702).

Exemplary Printed Receipt Including an Identification Code

Figure 18:
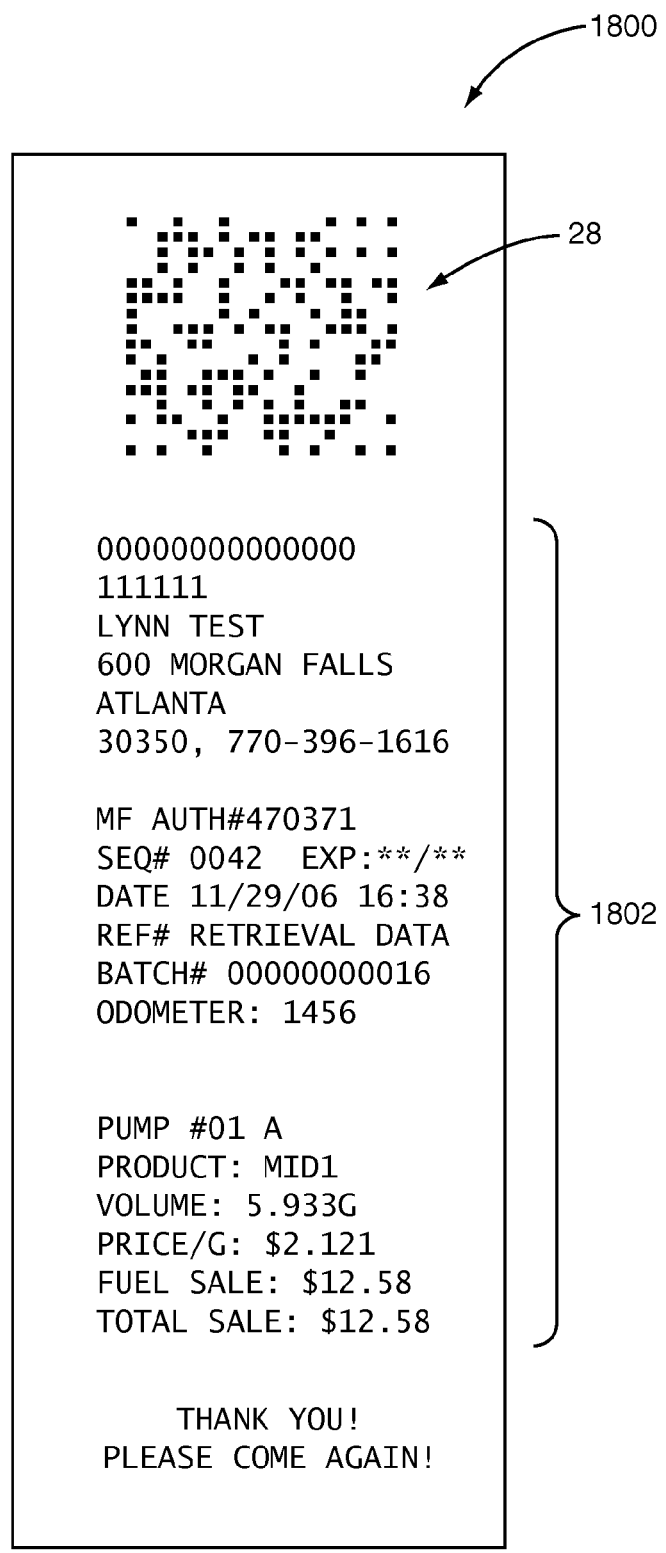
FIG. 18 is an exemplary printed receipt including a code that provides encoded transaction information and that may include alternative content according to an embodiment of the subject matter described herein.

As described above, the code 28 may be printed on a receipt. The receipt may then be scanned by the personal communication device 12 or a digital picture of the code 28 may be taken by a camera on the personal communication device 12. The receipt may also be given to another person to allow the other person to retrieve alternative content encoded into the code 28, for example, promotions, loyalty programs, and contest notifications. Additionally, an electronic receipt may be created by the personal communication device 12 and the electronic receipt may be imported into an accounting program to automate accounting for the customer. FIG. 18 illustrates an exemplary receipt including the code 28.

FIG. 18 is an exemplary printed receipt 1800 including the code 28 that provides encoded transaction information and that may include alternative content. While not limited to such, the code 28 depicted within FIG. 18 illustrates an exemplary MCode 28. As described above, the code 28 may also include a bar code, RFID encoded ink, or other encoding mechanism without departure from the scope of the subject matter described herein. The MCode 28 is an encoded version of the textual information 1802 included on the receipt 1800 below the printed MCode 28. As described above in association with certain embodiments, the customer may take a picture of the MCode 28 with a camera on the personal communication device 12 and an electronic version of the receipt 1800 may be generated. This electronic version of the receipt 1800 may be forwarded to an account for later retrieval and processing. Additionally, the MCode 28 may include alternative content, such as advertising, promotions, loyalty programs, and contest notifications, as described above.

Those skilled in the art will recognize improvements and modifications to the preferred embodiments of the present invention. All such improvements and modifications are considered within the scope of the concepts disclosed herein and the claims that follow.

What is claimed is:

1. A method for facilitating a transaction by a server and a retail device of a retail establishment, the method comprising the steps of:
providing an indicia via the retail device, wherein the indicia uniquely identifies the retail device and is capturable by a mobile device;
receiving the indicia at the server from the mobile device after being captured by the mobile device;
identifying the retail device based on the indicia;
selecting a first user interface based on the step of identifying the retail device; and
transmitting the first user interface to the mobile device.

2. The method of claim 1 further comprising receiving a selection of a first item from the mobile device made using the first user interface.

3. The method of claim 2 further comprising providing the first item to a user of the mobile device.

4. The method of claim 3 wherein the retail device provides the first item to the user of the mobile device.

5. The method of claim 4 wherein the retail device is a fuel dispenser and the first item is fuel.

6. The method of claim 3 wherein the first item is provided to the user of the mobile device at a store located adjacent the retail device.

7. The method of claim 2 further comprising receiving from the mobile device data sufficient to effect payment for the first item; and providing the first item upon verification of the data sufficient to effect payment for the first item.

8. The method of claim 7 further comprising transmitting an electronic receipt to the mobile device for the transaction.

9. The method of claim 7 wherein the data sufficient to effect payment for the first item comprises an account number associated with a payment card.

10. The method of claim 7 wherein the data sufficient to effect payment for the first item comprises an identifier that uniquely identifies the mobile device, the method further comprising retrieving account information associated with a user of the mobile device based on the identifier; and effecting payment for the first item using the account information.

11. The method of claim 2 further comprising transmitting a notification to the mobile device that the first item is ready to be dispensed.

12. The method of claim 11 further comprising verifying the notification as proof of purchase of the first item prior to the step of providing the first item.

13. The method of claim 2 further comprising selecting a second user interface based on the step of identifying the retail device; and transmitting the second user interface to the mobile device.

14. The method of claim 13 further comprising receiving a selection of a second item from the mobile device made using the second user interface; and dispensing the second item.

15. The method of claim 14 wherein the first item is dispensed by the retail device and the second item is dispensed at a store located adjacent the retail device.

16. The method of claim 1 further comprising identifying a user of the mobile device based on data received from the mobile device; and customizing the user interface based on a characteristic of the user.

17. The method of claim 16 wherein the user interface comprises an advertisement.

18. The method of claim 16 wherein the data comprises a unique identifier associated with the mobile device.

19. The method of claim 16 wherein the data comprises an account associated with the user and maintained by the retail establishment.

20. The method of claim 16 wherein the characteristic is selected from the group consisting of an age of the user, an income of the user, and an account associated with the user and maintained by the retail establishment.

21. The method of claim 1 further comprising identifying a location of the mobile device.

22. The method of claim 21 further comprising customizing the user interface based on the location.

23. The method of claim 21 further comprising determining whether to authorize the transaction based on a comparison of the location of the mobile device to a location of the retail device.

24. The method of claim 1 wherein the user interface comprises an advertisement.

25. The method of claim 24 wherein the advertisement is for a local vendor.

26. The method of claim 25 wherein the local vendor is a hotel.

27. The method of claim 1 wherein the indicia uniquely identifies the retail establishment.

28. The method of claim 1 wherein the user interface is a list of items that may be purchased from a store located adjacent the retail device.

29. The method of claim 28 wherein the store is a restaurant and the list is a menu of items offered by the restaurant.

30. The method of claim 1 wherein the retail device is operatively connected to the server via a wide area network.

31. The method of claim 1 further comprising identifying the retail establishment based on the step of identifying the retail device; and selecting the user interface based on the step of identifying the retail establishment.

32. The method of claim 1 further comprising receiving at the server from the mobile device data representative of a language; and translating the user interface into the language.

33. A method for facilitating a transaction using a server and a retail device of a retail establishment, the method comprising the steps of:
capturing on a mobile device an indicia provided by the retail device, wherein the indicia uniquely identifies the retail device;
transmitting the indicia to the server using the mobile device; and
receiving from the server on the mobile device a user interface corresponding to the retail establishment, whereby the user interface was selected by the server based on an identification of the retail device and the retail device was identified by the server using the indicia.

34. The method of claim 33 wherein the indicia is transmitted from the mobile device to the server via the retail device.

35. The method of claim 33 further comprising establishing a direct connection between the mobile device and the retail device based on a code received from the server.

36. The method of claim 33 further comprising storing the user interface on memory of the mobile device; and presenting the user interface on the mobile device.

37. The method of claim 36 further comprising receiving, at the mobile device from the server, an identification of the user interface, wherein the step of presenting the user interface on the mobile device comprises loading the user interface from the memory of the mobile device based on the identification of the user interface received from the server.

38. The method of claim 36 further comprising purchasing an item from the retail establishment using the user interface; and receiving a notification at the mobile device that the item is ready.

39. The method of claim 38 further comprising receiving the item from the retail establishment upon presentation of the notification to the retail establishment.

40. The method of claim 33 further comprising translating the user interface by the mobile device into a specific language, wherein data stored on the mobile device identifies the language.

41. The method of claim 33 wherein the user interfaced is used to interact with the retail device.

42. The method of claim 33 wherein the indicia is a graphical identifier.

43. The method of claim 42 wherein the step of capturing indicia comprises taking a picture of the graphical identifier using the mobile device.

44. The method of claim 42 wherein the graphical identifier is a barcode.

45. The method of claim 44 wherein the barcode is two-dimensional.

46. The method of claim 45 wherein the two-dimensional barcode is a mobile code.

47. The method of claim 33 wherein the indicia is a sound wave.

48. The method of claim 47 wherein the step of capturing indicia comprises recording the sound wave using the mobile device.

49. The method of claim 33 wherein the indicia is a wireless signal.

50. The method of claim 19 wherein the wireless signal complies with IEEE 802.11 standards.

51. The method of claim 49 wherein the wireless signal is a radio wave.

52. The method of claim 51 wherein the radio wave is provided by an energized radio frequency identification tag.

53. The method of claim 51 wherein the wireless signal is provided by a radio frequency identification tag reader.

54. The method of claim 49 wherein the wireless signal complies with Bluetooth standards.

55. A system for facilitating a transaction for a retail establishment comprising:
a retail device having a fixed physical location and configured to provide an indicia that uniquely identifies the retail device and is capable of being captured by a mobile device; and
a server configured to receive data representative of the indicia, identify the retail device based on the data, select a user interface based on the identification of the retail device, and transmit the user interface to the mobile device.

56. A server for facilitating a transaction for a retail establishment having a retail device, wherein the server is configured to:
receive data from a mobile device representative of an indicia provided by the retail device to the mobile device, whereby the indicia uniquely identifies the retail device;
identify the retail device based on an analysis of the indicia;
select a user interface associated with the retail device based on the identification of the retail device; and
transmit the user interface to the mobile device.

57. The server of claim 56 wherein the user interface provides a user with a discount when presented to the retail establishment.

58. The server of claim 56 wherein the user interface may be transmitted to another mobile device.

59. The server of claim 56 configured to receive data from the mobile device representative of a location of the mobile device; and determine whether to cancel the transaction based on a comparison of the location of the mobile device and a location of the retail device.

60. The server of claim 56 wherein the data comprises an identifier of the mobile device.

61. The server of claim 60 configured to determine a location of the mobile device using the identifier of the mobile device; and determine whether to authorize the transaction based on a comparison of the location of the mobile device and a location of the retail device.

62. The server of claim 60 configured to identify an account associated with the mobile device based on the identifier of the mobile device.

63. The server of claim 62 configured to retrieve demographic information about an owner of the mobile device based on the identification of the account associated with the mobile device; and customize the user interface based on the demographic information.

64. The server of claim 63 wherein the demographic information comprises information regarding an income of the owner and the user interface is an advertisement customized based on the information regarding the income.

65. A method for facilitating a transaction for a retail establishment that comprises a retail device, the method comprising the steps of:
receiving first data from a mobile device representative of an indicia, wherein the indicia uniquely identifies the retail device and is provided by the retail device to the mobile device;
receiving second data from the mobile device representative of payment information;
identifying the retail device based on an analysis of the first data; and
instructing the retail device to dispense an item based on the second data.

66. The method of claim 65 wherein the retail device is a fuel dispenser and the item is fuel.

67. The method of claim 65 further comprising:
receiving data representative of a location of the mobile device;
comparing the location of the mobile device to a location of the retail device; and
based on the comparison, determining whether to perform the step of instructing the retail device to dispense an item based on the second data.

68. The method of claim 65 further comprising selecting a user interface based on the step of identifying the retail device based on an analysis of the first data.

69. The method of claim 68 further comprising receiving data representative of the item from the mobile device wherein the item is selected using the user interface.

70. A retail device located within a retail environment and configured to dispense an item, the retail device comprising a mechanism to provide an indicia that uniquely identifies the retail device, wherein the indicia is configured to be captured by a mobile device and transmitted to a server, whereby the indicia, when transmitted from the mobile device to the server, allows the server to identify the retail device, select a user interface based on an identification of the retail device, and transmit the user interface to the mobile device.

71. The retail device of claim 70 wherein the retail device receives data representative of an authorization to dispense the item, wherein the data representative of the authorization was transmitted to the retail device based on information received from the mobile device due to interaction with the user interface by a user of the mobile device.

72. The retail device of claim 71 wherein the retail device receives the data representative of the authorization from the server.

73. The retail device of claim 70 wherein the retail device is configured to interact with the mobile device via the user interface.

* * * * *